(12) United States Patent
King, Jr.

(10) Patent No.: US 12,259,157 B2
(45) Date of Patent: Mar. 25, 2025

(54) EXHAUST VENT AND UTILITY TERMINATION FOR HVAC LINE SETS AND ELECTRICAL WIRES

(71) Applicant: Roof Goose Vent LLC, North Kingstown, RI (US)

(72) Inventor: Jack F. King, Jr., North Kingstown, RI (US)

(73) Assignee: Roof Goose Vent LLC, North Kingstown, RI (US)

( * ) Notice: Subject to any disclaimer, the term of this patent is extended or adjusted under 35 U.S.C. 154(b) by 656 days.

(21) Appl. No.: 17/521,102

(22) Filed: Nov. 8, 2021

(65) Prior Publication Data

US 2022/0057090 A1    Feb. 24, 2022

Related U.S. Application Data

(63) Continuation-in-part of application No. 17/492,028, filed on Oct. 1, 2021, and a continuation-in-part of
(Continued)

(51) Int. Cl.
*H02G 3/04* (2006.01)
*F24F 7/02* (2006.01)
(Continued)

(52) U.S. Cl.
CPC ............ *F24F 7/02* (2013.01); *H02G 3/04* (2013.01); *F24F 2007/001* (2013.01); *F24F 13/14* (2013.01); *F24F 2221/52* (2013.01)

(58) Field of Classification Search
CPC .......... H02G 3/04; H02G 3/22; H02G 3/0481; H02G 3/0418; F24F 7/02; F24F 13/14;
(Continued)

(56) References Cited

U.S. PATENT DOCUMENTS

| 2,865,981 A | 12/1955 | Budnick |
| 2,993,084 A * | 7/1961 | Curtiss ............ H02G 3/22 |
| | | 174/81 |

(Continued)

FOREIGN PATENT DOCUMENTS

| CA | 2326371 C | 12/2006 |
| CN | 201395904 Y | 2/2010 |

(Continued)

OTHER PUBLICATIONS

Menzies Metal Products, Electrical Roof Flashing, https://www.menzies-metal.com/steep-roofing/electrical-roof-flashing/, Nov. 2, 2020, 3 pages.
(Continued)

*Primary Examiner* — Angel R Estrada
(74) *Attorney, Agent, or Firm* — Breiner & Breiner, L.L.C.

(57) ABSTRACT

The present invention is directed to an exhaust vent assembly including a sleeve, a neck, a damper in the neck, a cap attached to the neck and a collar. The exhaust vent assembly may be configured without any tools and without any penetrative fasteners. The invention is further directed to a utility termination for HVAC line sets, electrical wires or the like. The utility termination includes a plastic sleeve, a plastic cover and a cap. The components for utility terminations may also be used to fabricate the exhaust vent.

18 Claims, 16 Drawing Sheets

Related U.S. Application Data application No. 16/224,236, filed on Dec. 18, 2018, now Pat. No. 11,168,906, said application No. 17/492,028 is a continuation of application No. 16/224,236, filed on Dec. 18, 2018, now Pat. No. 11,168,906.

(60) Provisional application No. 63/112,349, filed on Nov. 11, 2020, provisional application No. 62/609,122, filed on Dec. 21, 2017.

(51) Int. Cl.
*F24F 7/00* (2021.01)
*F24F 13/14* (2006.01)

(58) Field of Classification Search
CPC ............ F24F 2007/001; F24F 2221/52; F24F 13/082; F24F 11/88; F24F 11/89; E04D 13/143
USPC .. 174/81, 68.1, 650, 66, 74 R, 77 R, 80, 82, 174/99 R, 137 R; 385/134, 135; 285/45, 285/179; 248/68.1, 49
See application file for complete search history.

(56) References Cited

U.S. PATENT DOCUMENTS

| | | | |
|---|---|---|---|
| 3,042,736 A | | 8/1962 | Salisbury |
| 3,287,488 A | * | 11/1966 | Piasecki ............... H02G 3/22 174/81 |
| 3,328,513 A | * | 6/1967 | Goldsobel ............ H02G 3/22 174/81 |
| 3,337,689 A | * | 8/1967 | Rudolph ............... H02G 3/22 174/80 |
| 4,424,834 A | * | 1/1984 | Sumi ................... F16L 11/11 428/483 |
| 4,876,414 A | * | 10/1989 | Johnson ............... H02G 3/22 174/81 |
| 5,067,291 A | | 11/1991 | Evensen |
| 5,226,263 A | | 7/1993 | Merrin et al. |
| 5,344,363 A | | 9/1994 | Pollock |
| 5,791,985 A | | 8/1998 | Schiedegger et al. |
| 6,085,797 A | * | 7/2000 | Grabaum ............. F16D 3/845 427/386 |
| 6,183,360 B1 | | 2/2001 | Luter et al. |
| D445,205 S | | 7/2001 | Thaler |
| 6,543,187 B1 | | 4/2003 | Menzies |
| 6,994,622 B2 | | 2/2006 | Koessler |
| 9,091,377 B2 | | 7/2015 | Lechuga |
| 9,337,647 B2 | * | 5/2016 | Gilleran ................ F16L 5/02 |
| 9,772,050 B2 | | 9/2017 | Gilleran |
| 10,234,154 B2 | | 3/2019 | Ramsay et al. |
| 10,267,533 B2 | | 4/2019 | Mantyla et al. |
| 10,422,134 B2 | | 9/2019 | Gabriel, V et al. |
| 11,146,048 B2 | * | 10/2021 | Wilson, Sr. ........... H01B 17/66 |
| 11,362,501 B2 | * | 6/2022 | Wilson, Sr. ........... H02G 3/24 |
| 2009/0218132 A1 | | 9/2009 | Delakowitz |
| 2017/0191683 A1 | | 7/2017 | Seemann |
| 2020/0240655 A1 | | 7/2020 | King, Jr. |

FOREIGN PATENT DOCUMENTS

| | | |
|---|---|---|
| EP | 2930283 A1 | 10/2015 |
| KR | 100963486 B1 | 6/2010 |

OTHER PUBLICATIONS

LexGoShop, Flash-Tite Wire Outlet Post, Multi-Port Wire Protection, Roof, Flashings, https://lexgoshop.com/product/flash-tite-wire-outlet-post/, Nov. 2, 2020, 5 pages.

LexGoShop, Flash-Tite Cable Outlet Post, Roof Flashings, https://lexgoshop.com/product/flash-tite-cable-outlet-post/, Nov. 2, 2020, 4 pages.

Flat Roof Doctor, https://flatroofdoc.com/flat-roof-repair-drains-flashing-videos/, Sep. 29, 2020,5 pages.

Best Materials, Portals #29430 5-Port Flashing Cover, 5 C-555 Caps, Clamps, https://www.bestmaterials.com/detail.aspx?ID=20537&gclid=EAlalQobChMI1da2v8CM7AIV9vLjBx2gZA/OsEAQYBSABEgIUR_D_BWE, Sep. 29, 2020, 2 pages.

Grainger, Roof Flashing, www.grainger.com/product/4YN31?gclid=EAlalQobchMI1da2v8CM7AV9vLjBx2gZAQsEAQYASABEgKgb_D_Bwe&cm_mmc=PPC:+Google+PLA&ef-id=EAlalQobChMI1da2v8CM7AIV9vLjBx2gZAOsEAQYSABEgKgb_D_Bwe:G:s&s_kwcid=AL!2966!3!264955916051!!!g!437083570253!&gucid=N:N:PSPaid:GGL:CSM-2295:XUCJF:20500731, 2 pages.

\* cited by examiner

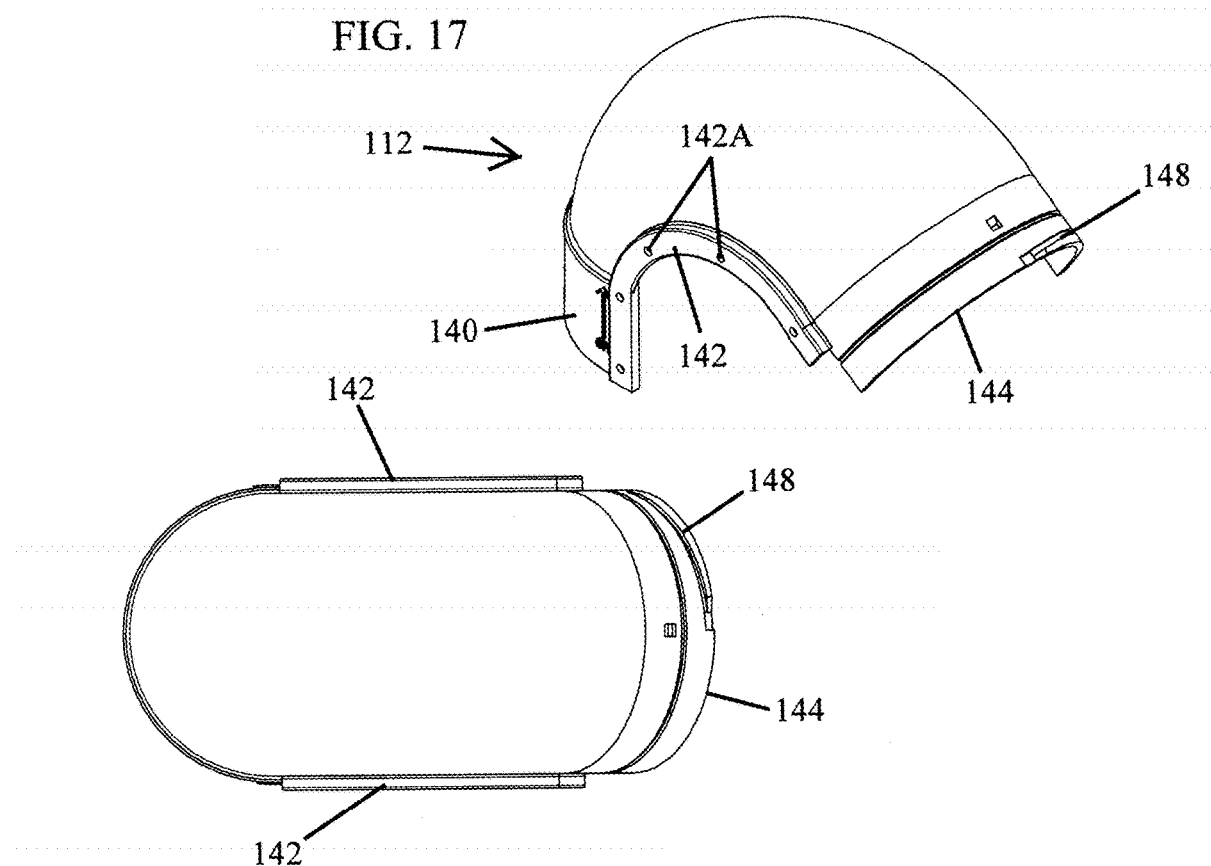
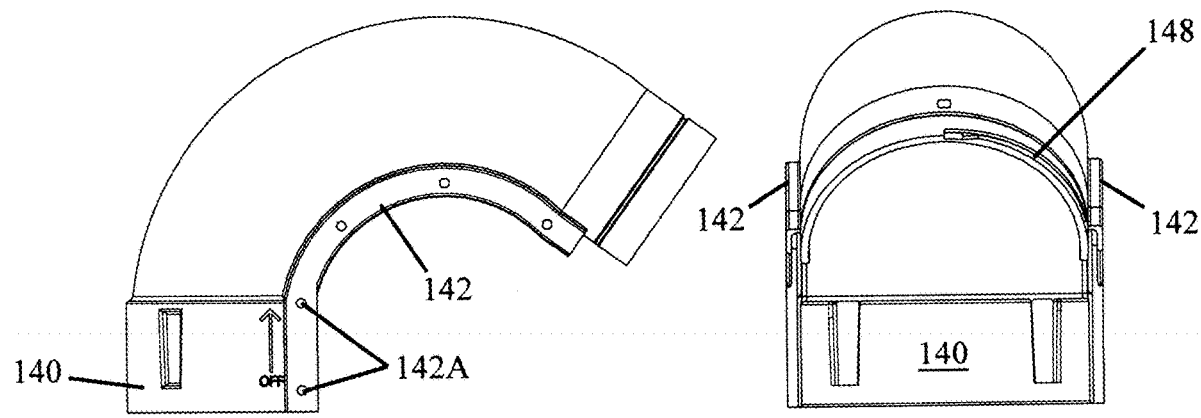
FIG. 17

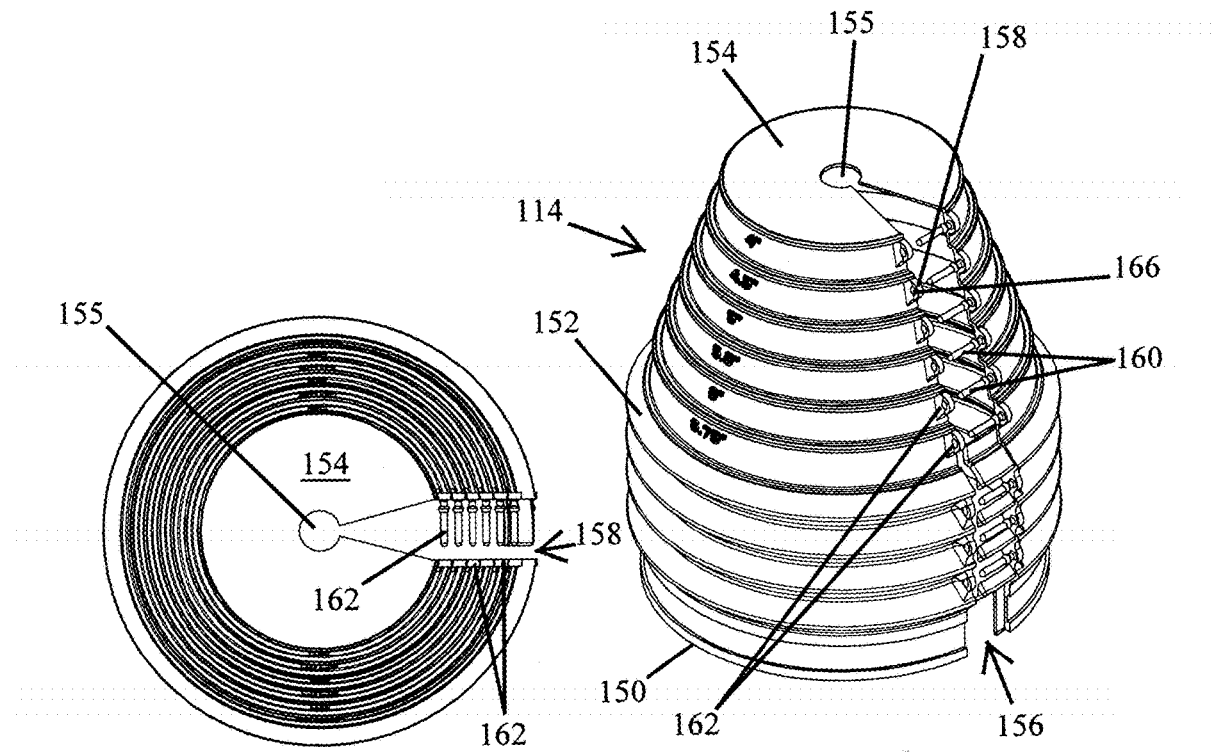

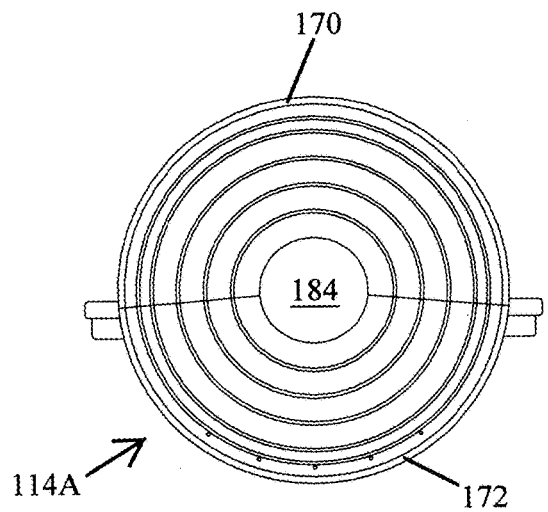
FIG. 19B
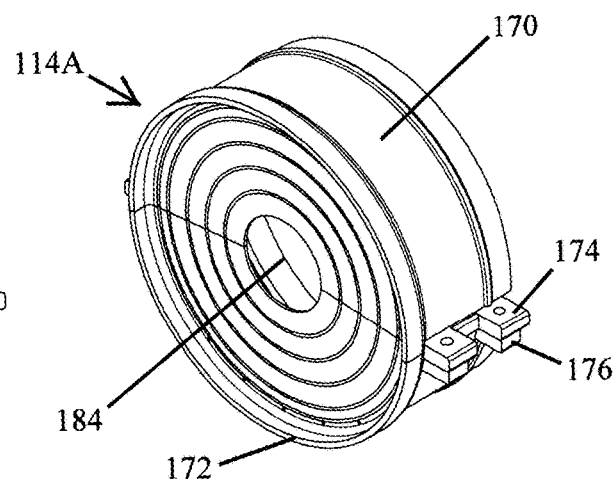
FIG. 19
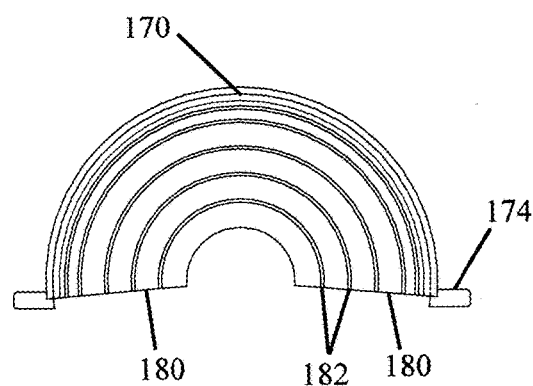
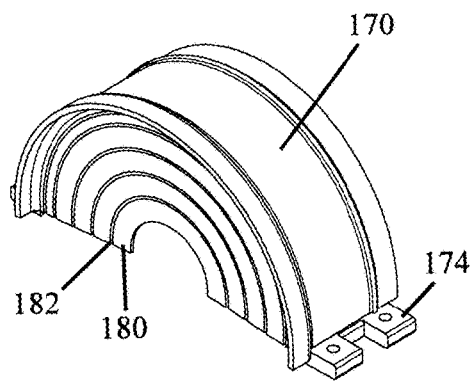
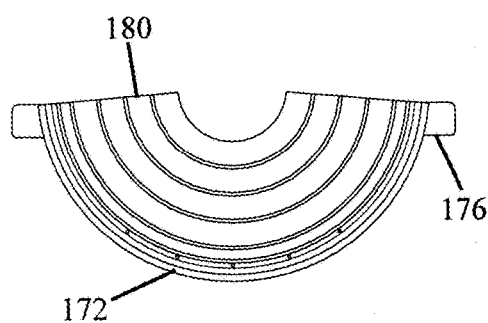
FIG. 19C
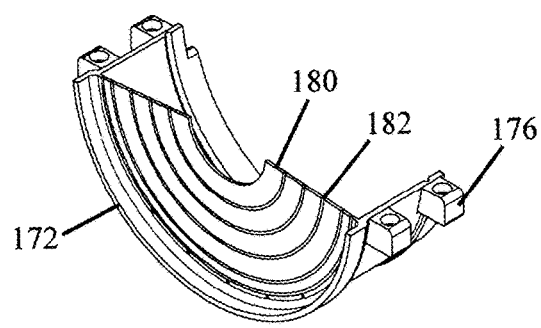
FIG. 19A

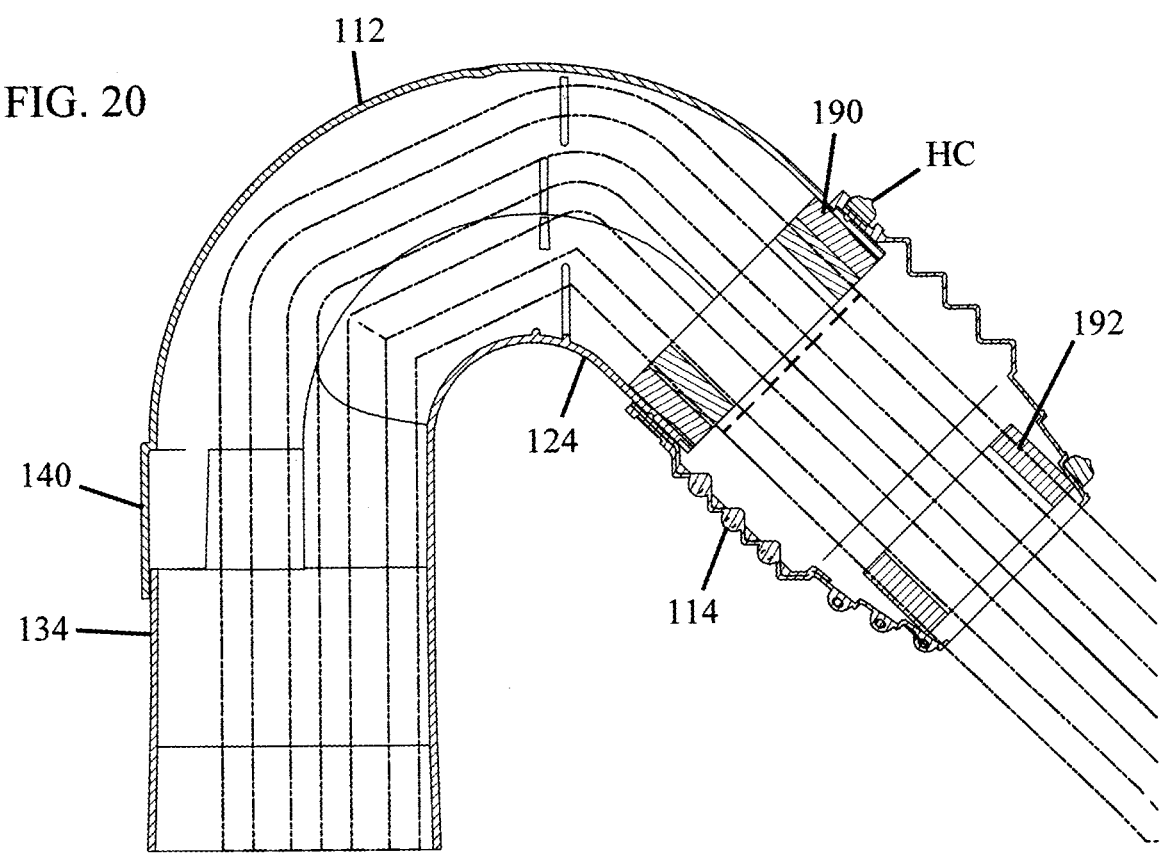
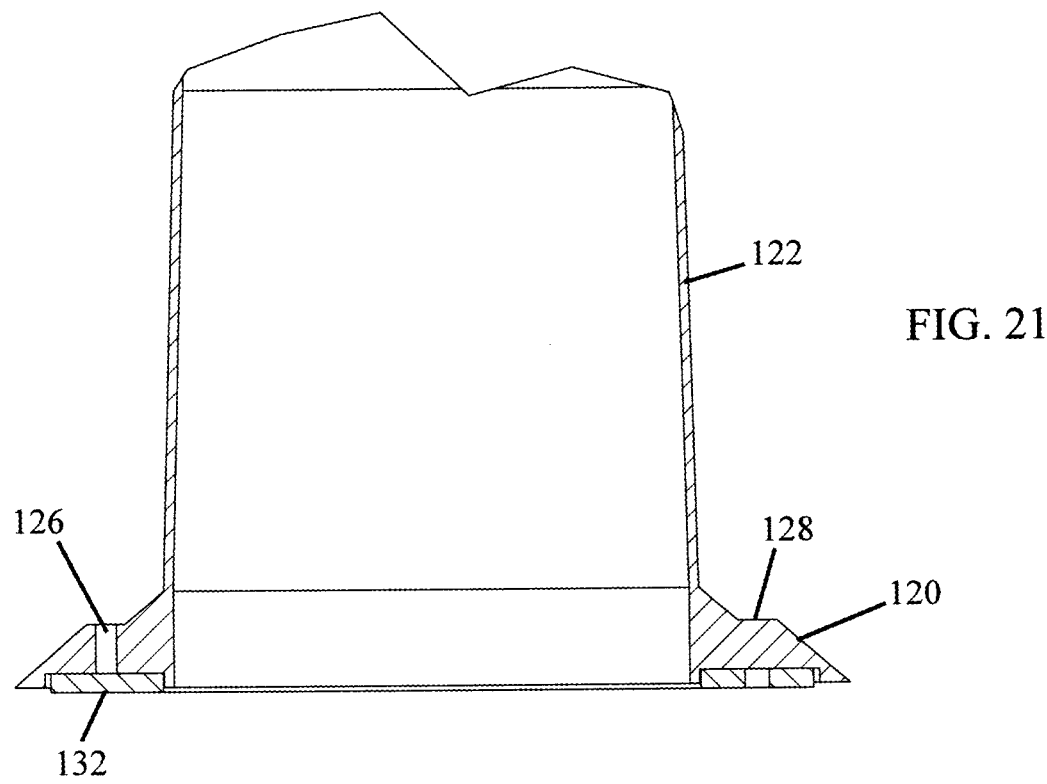

EXHAUST VENT AND UTILITY TERMINATION FOR HVAC LINE SETS AND ELECTRICAL WIRES

RELATED APPLICATION

This application claims benefit of U.S. Provisional Application Ser. No. 63/112,349, filed Nov. 11, 2020, entitled "Exhaust Vent And Utility Termination For HVAC Line Sets And Electrical Wires," and is a continuation-in-part of U.S. application Ser. No. 17/492,028, filed Oct. 1, 2021, entitled "Exhaust Vent" and U.S. application Ser. No. 16/224,236, filed Dec. 18, 2018, entitled "Exhaust Vent," which applications claim benefit of U.S. Provisional Application Ser. No. 62/609,122, filed Dec. 21, 2017, entitled "Exhaust Vent," all of which applications are incorporated herein by reference in their entirety.

FIELD OF THE INVENTION

The present invention relates to an exhaust vent and a utility termination for HVAC line sets and electrical wires. More particularly, the invention relates to an exhaust vent for use on a flat roof for venting of a dryer, a bathroom, a kitchen or the like; and to a utility termination for use on a flat roof for HVAC line sets, electrical wires or the like.

BACKGROUND OF THE INVENTION

The invention is directed to exhaust vents and utility terminations for HVAC line sets, electrical wires or the like (hereafter "utility termination") for use on flat roofs such as in multi-family residential construction, restaurants and commercial buildings.

Contractors often bring individually a dryer exhaust duct or a bathroom exhaust duct or a kitchen exhaust duct up through a flat roof individually using single wall galvanized steel ducts, e.g. 28 gauge galvanized steel. The termination of the duct is problematic because it needs to be weatherproof for protection of the exposed galvanized duct, flashed into the surrounding roof membrane, wind protected, insect or bird proof and still allow maximum design free air flow. All terminations on a flat roof must rise vertically some distance to satisfy code requirements for height above the roof to allow for protection from snow, rain pooling or debris being pulled into the duct. In the case of an exhaust duct, the exhaust vent requires a backdraft damper which necessities use of a separate and distinct assembly inserted into a field assembly of 90 degree sheetmetal elbows or using a typical sidewall vent adapted to a separate 90 degree elbow. This internal backdraft assembly, also known as a butterfly damper, diminishes the free air due to it being an independent assembly and consisting of two separate spring loaded wings folding inward from the centerline. These butterfly dampers restrict the free area more than an integral single plane backdraft damper. This field assembly is unsightly looking and creates many radial and longitudinal seams that need to be weatherproofed. Mastics for weatherproofing such seams are labor-intensive and subject to degradation over time. Mastics also look unsightly as they are different colors than the underlying metal duct and, therefore, present an unfinished appearance. Similarly, caulks for such seams are difficult to apply and paint over. Additionally, the application of all such seam coverings require the appropriate weather conditions to apply and dry the covering to a manufacturers' specifications. Moreover, these known assemblies use products from multiple manufacturers, require numerous field assembled joints and are labor intensive and expensive to install.

In the case of a clothes dryer exhaust vent, the 2015 International Mechanical Code ("IMC") does not allow penetrative fasteners to be used. This is specified in section 504.4, page 5-32 stating that ducts shall not be connected or installed with sheetmetal screws or other fasteners that will obstruct the exhaust flow. Therefore, current industry practice is to use mastics or very short screws to keep the assembly together. However, such penetrative fasteners are contrary to the intent of the code.

In a dryer exhaust vent, the IMC specifically mandates that the termination of a dryer exhaust cannot obstruct the free area of the exhaust duct it serves and does not allow a screen on the termination of the duct. This is specified, for example, in the 2015 IMC at section 504.4, page 5-33, providing that a full opening in exhaust systems is considered to be an opening having no dimensions less than the diameter of the exhaust duct. The 2018 IMC goes further in defining acceptable openings as specified at section 504.4.1, page 49, stating that the passageway of dryer exhaust duct terminals shall be undiminished in size and shall provide an open area of not less than 12.5 square inches. Further, in a dryer exhaust vent assembly, the IMC does not allow a screen on the termination of the duct. This creates an opening for birds to nest in exhaust vent assemblies using an internal backdraft damper due to the damper being inset into the duct. Reference is made herein to different versions of the IMC as certain jurisdictions may not have adopted the latest version of the IMC.

Various types of exhaust venting terminations are known such as roof jacks, sidewall vent hoods and field assembled gooseneck type assemblies. These known venting solutions present problems in installation and use. Devices such as roof jacks require expensive separate roof curbs to be flashed into a roof and then the roof jack to be flashed into the curb in order to gain the required height above the flat roof. This is very labor intensive as each layer (curb) and then roof jack requires coordination and work by separate trades in sequential order. Side wall vent hoods require an exposed round duct to be run vertically above the roof and then turned 90 degrees to allow the side wall vent hood to be orientated properly. This type of assembly requires penetrative fasteners to hold the cap in place as well as weatherproofing. Field built gooseneck assemblies also require vertical rise duct which then need weatherproofing and numerous field assemblies to be combined into a functional exhaust vent. Field designed assemblies lack any consistency or quality control and vary greatly in their effectiveness and cost. Additionally, such devices may have passageways which diminish in size and thereby create back pressure decreasing the efficiency of the exhaust vent. Accordingly, there is a need for an improved exhaust vent.

HVAC units are installed on flat top roofs, primarily for office buildings and multi-unit residential buildings. The HVAC line sets are brought out through an opening in the roof and connected to the HVAC unit. Normally, there is a hole made in the roof through which the HVAC line sets or other electrical wires (hereafter collectively "line sets") are pulled through for attachment to the HVAC unit. Presently, a roofing contractor makes a pitch pocket in the roof through which the line sets are pulled through as shown, for example, in FIG. 11. A pitch pocket is generally a small curb like frame through which an HVAC mechanic runs the line sets and then the roofer fills the box with a flowable sealant. In other instances, when multiple line sets are used, the contractor may build a vault or metal curb which is fabricated to include a lid or cover. Further, in other devices the line sets must be bent and pulled through a 90 degree elbow which is difficult and time consuming. These prior art utility terminations have a number of problems, including that they are not made for ease of access for repair or for adding additional line sets.

The above and other shortcomings of known exhaust vents and utility terminations are addressed by the present invention.

SUMMARY OF THE INVENTION

A primary object of the present invention is to provide a new and useful exhaust vent.

Another primary object of the invention is to provide for a duct vent termination for use on a flat roof.

Another primary object of the invention is to provide an exhaust vent for a dryer exhaust or a bathroom exhaust or a kitchen exhaust for use on a flat roof.

Another primary object of the invention is to provide an exhaust vent for a dryer exhaust, bathroom exhaust, kitchen exhaust, or fresh air inlet for use on a flat roof which is light weight, simple in construction, does not require separate weatherproofing or painting and is easy to install.

Another primary object of the invention is to provide an exhaust vent, preferably waterproof, that can be installed during construction prior to the roof membrane and which exhaust vent is weatherproof and can be flashed directly to by the roofer.

Another primary object of the invention is to allow commonly used round vent ducting to be weatherproofed and terminated without penetrative fasteners.

Another primary object of the invention is to provide an exhaust vent which allows common round duct risers to be insulated within an annular space created by a weatherproof sleeve of the exhaust vent.

Another primary object of the invention is to provide an exhaust vent which facilitates the installation of the exhaust vent from below a roof by virtue of using a sleeve which surrounds a duct wherein the sleeve has four mounting apertures at one end of the sleeve and which are aligned with four locking channels at the other end of the sleeve. This allows for multiple exhaust vent assemblies to be uniformly oriented in the same direction.

Another primary object of the invention is to provide an exhaust vent having a neck and a sleeve wherein the neck may be mounted to the sleeve without tools and rotated 360 degrees on the sleeve in 90 degree increments. This tool-less adjustability allows an installer a large margin of error for code mandated clearances to other rooftop terminations or equipment as well as the ability to place the exhaust vent neck in the best position for the conditions on the roof.

Another primary object of the invention is to allow preexisting round ducts on a flat roof to be retrofitted with a weatherproof termination that counter-flashes and protects existing ducts without penetrative fasteners regardless of weather conditions.

Another primary object of the invention is to provide an exhaust vent which meets code requirements of no penetrative fasteners, including in the IMC. This is achieved by the exhaust vent of the invention which is easily installed or removed without tools, thereby providing for ease of cleaning and unobstructed duct access.

Another primary object of the invention is to provide an exhaust vent having a cap which functions as a bird guard for dryer vent applications and which is easily removeable without tools.

Another primary object of the present invention is to provide an exhaust vent, especially useful for dryers, having a slightly oversized round duct long radius gooseneck termination which provides approximately 8% greater free area than using existing 90 or 45 degree metal fittings. This extra free area and seamless smooth internal surface may mitigate the friction loss of an internal damper and improve the installed performance of the underlying exhaust duct.

Another primary object of the invention is to provide an exhaust vent which is a color coordinated and having a horizontal female neck over a male sleeve, the neck and sleeve being connected by a twist lock mechanism.

Another primary object of the invention is to provide an exhaust vent which provides an elegant solution to duct cleaning and inspection from a roof. The exhaust vent includes a neck assembly having a backdraft damper integral to itself and is easily removed and reinstalled without tools or degradation of mastics or caulks.

Another primary object of the invention is to provide an exhaust vent which reduces the labor and material costs associated with installing existing exhaust vents.

Another primary object of the invention is to provide an exhaust vent having a seamless smooth solvent weldable surface which a roof membrane may be flashed to.

Another primary object of the invention is to provide an exhaust vent having a larger internal backdraft damper protected from the elements and made more effective due to its eccentric position within the exhaust vent neck's internal elevated position and, therefore, being better protected from the wind.

Another primary object of the invention is to provide an exhaust vent having a plastic internal eccentric backdraft damper within a plastic exhaust vent assembly, thereby not being as noisy as typical metal backdraft dampers within typical metal elbows.

Another primary object of the invention is to provide an entire corrosion proof nonmetallic exhaust vent assembly.

The exhaust vent of the invention comprises a sleeve, a neck, a damper in the neck, a cap attached to the neck and a storm collar. The invention may further utilize a bushing to provide further benefit to the exhaust vent.

Another primary object of the invention is to provide a utility termination for line sets.

Another primary object of the invention is to provide a utility termination for line sets which allow for ease in repair and in adding additional line sets.

Another primary object of the invention is to provide a utility termination for line sets which has few parts, is easy to install, is easy to pull the line sets through, has an open 135 degree trough allowing for ease of bending the line sets, and works well in the field.

Another primary object of the invention is to provide for a utility termination for line sets which allows a contractor easy access to the line sets during connection of the line sets and thereafter provides a weatherproof enclosure for the line sets at the roof opening.

Another primary object of the invention is to provide a utility termination for line sets which allows an installer to look down the vertical annular opening of a sleeve member to push or pull the line sets straight up.

Accordingly, the present invention is directed to a utility termination assembly for use on a flat roof comprising a plastic sleeve adapted to overlie an opening in the roof and having a flashing, a plastic annular body with a first part of a gooseneck, a plastic second part of a gooseneck adapted to attach to the first part of the gooseneck of the plastic sleeve, and a cap adapted to be attached to an outer end of the first and second gooseneck parts.

Another primary object of the invention is directed to a modular system that can be manufactured as a utility termination and exhaust vent components may be added during the manufacturing process to provide for an exhaust vent, thereby saving expense.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings:

FIG. 16 is a perspective view; FIG. 16D is a cross-section taken along lines 16D-16D of FIG. 16C.

FIGS. 17-17C show views of the cover of the utility termination of FIG. 13. FIG. 17 is a perspective view; FIG. 17A is a front view; FIG. 17B is a side view; and FIG. 17C is a top view.

FIGS. 18-18C shows views of the cap of the utility termination of FIG. 13. FIG. 18 is a perspective view; FIG. 18A is a side view showing the connecting means; FIG. 18B is another side view; and FIG. 18C is a top view.

FIGS. 19-19C show views of an alternative cap for the utility termination of FIG. 13. FIG. 19 is a front perspective view; FIG. 19A shows the two parts of the cap of FIG. 19; FIG. 19B is a rear view of the cap of FIG. 19; and FIG. 19C shows the two parts of the cap of FIG. 19B.

FIG. 20 is a partial cross-section of the utility termination of FIG. 14.

FIG. 21 is a partial cross-section of the utility termination of FIG. 14 with the addition of a gasket to further seal the utility termination.

DETAILED DESCRIPTION OF THE PREFERRED EMBODIMENTS

The present inventions are directed to exhaust vents and utility terminations for line sets. FIGS. 1-10 show the presently preferred embodiments of the exhaust vents of the invention. The utility terminations are shown in FIGS. 12-21. The utility terminations utilize certain aspects of the exhaust vents and parts of the exhaust vents may be used to convert parts for a utility termination to an exhaust vent. The inventions will now be described in further detail.

Figure 1:
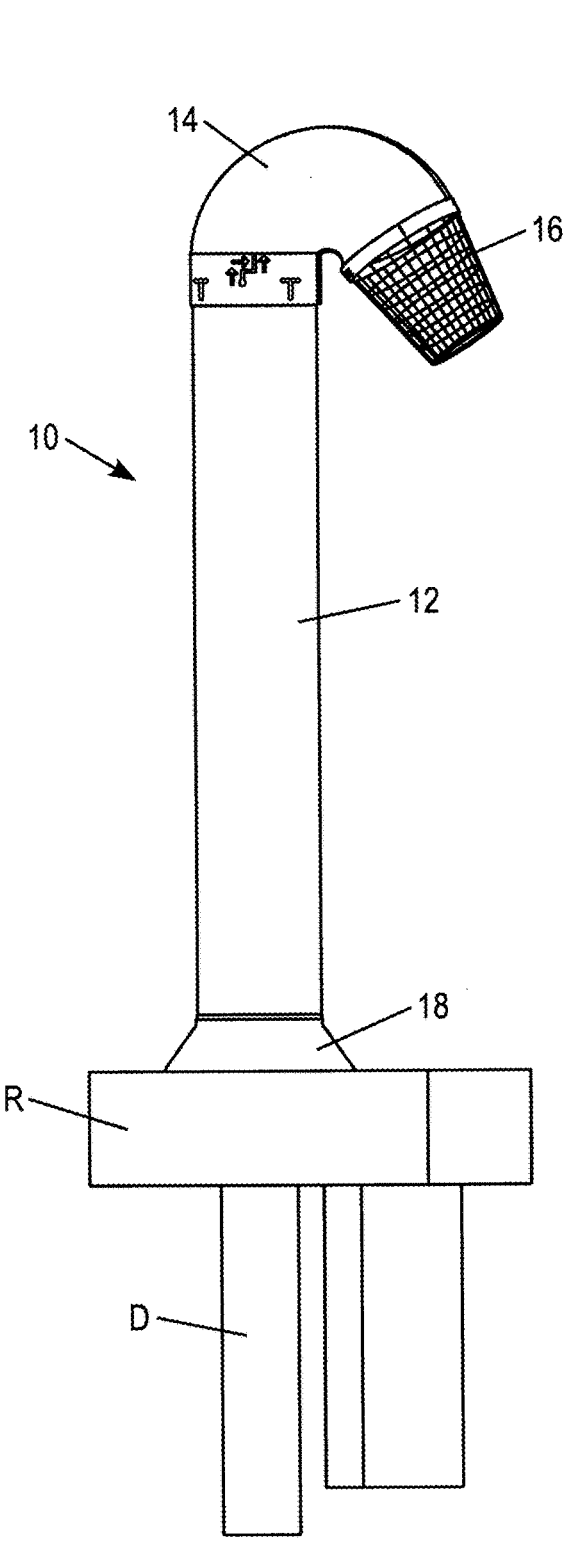
FIG. 1 is a plan view of the exhaust vent of the present invention.

Referring to FIG. 1, there is shown the exhaust vent of the present invention. The exhaust vent is useful for exhaust terminations in flat roof construction for dryer exhaust, bathroom exhaust, kitchen exhaust and the like. The invention will be explained herein for convenience with respect to a dryer exhaust. However, the invention is applicable to vent exhausts from other applications.

Figure 2:
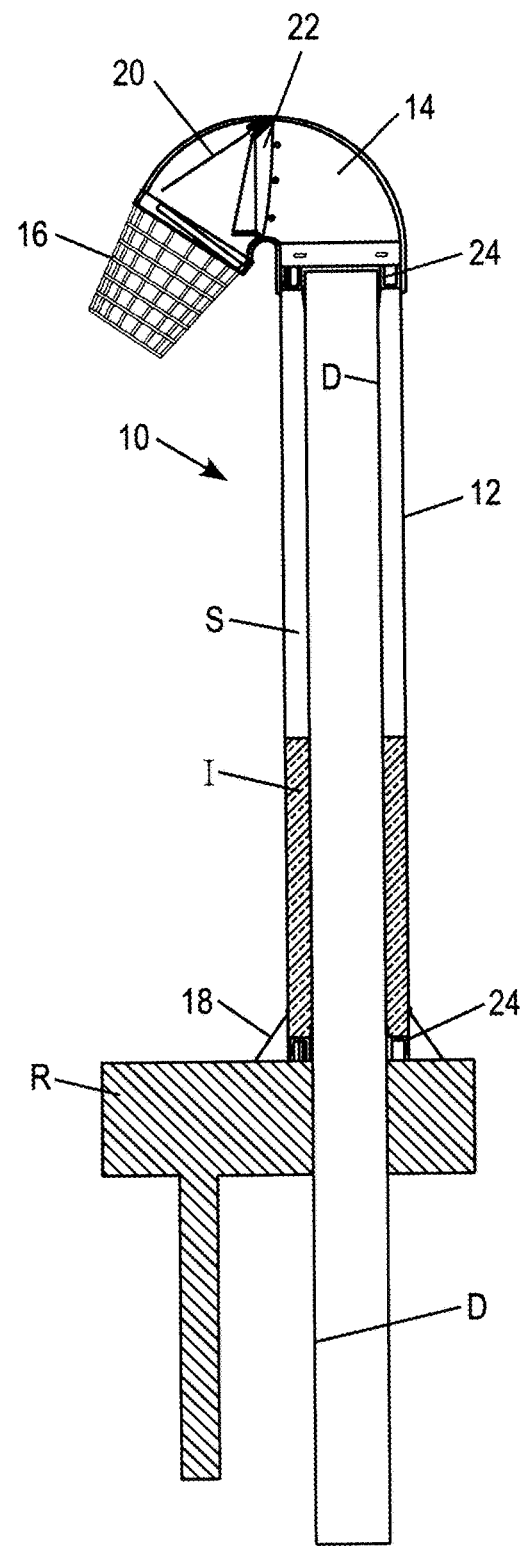
FIG. 2 is a cross-section of the exhaust vent of FIG. 1.

Referring to FIG. 1, there is shown a plan view of the exhaust vent 10 for a dryer exhaust. There is shown a flat roof R and a four inch galvanized steel duct D which is attached a dryer exhaust (not shown). The duct D may extend above the roof R generally from about 18 inches to about 42 inches as shown in FIG. 2. In the presently preferred embodiment, the primary components of the invention comprise a sleeve 12, a neck 14, a cap 16, a storm collar 18, a damper 20 and a damper ring 22. In certain applications of the invention, the exhaust vent assembly may include a bushing 24. Each of these components will now be described in greater detail.

Figure 10:
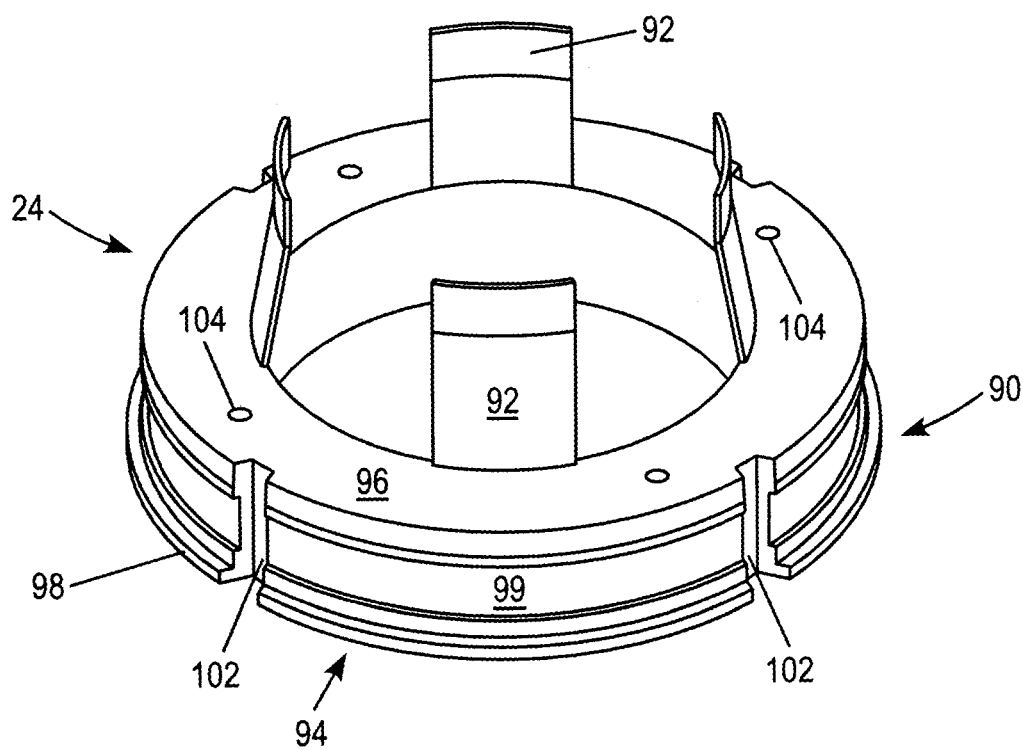
FIG. 10 shows a perspective view of a bushing which may be used in certain embodiments of the exhaust vent of the invention and shown in FIGS. 2, 2A and 2B.
Figure 11:
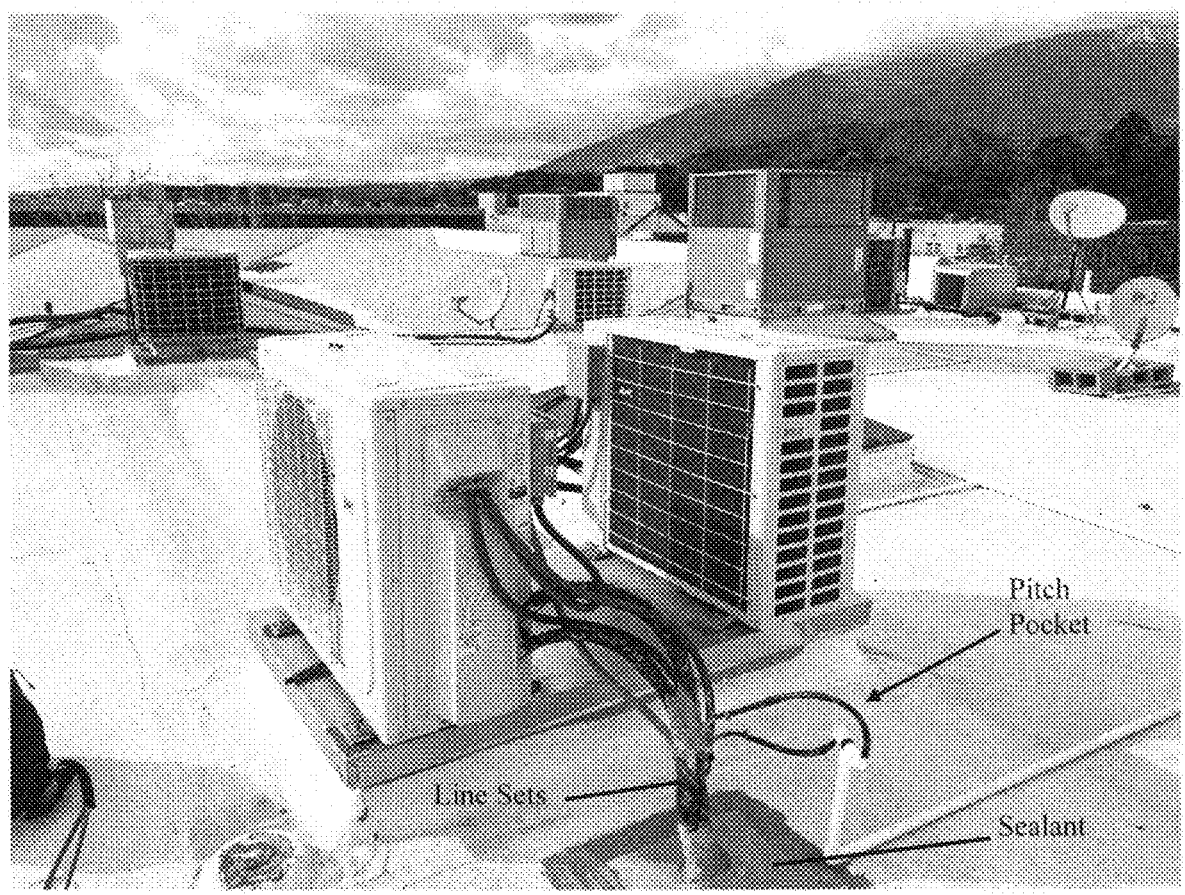
FIG. 11 shows a prior art utility termination.

As seen generally in FIG. 1, the round galvanized duct D will extend through the roof R, generally from about 18 inches to about 42 inches. In one preferred embodiment, sleeve 12 may be the same length as the length that the galvanized duct extends from the roof. The sleeve 12 may fit snuggly over the galvanized duct D or be spaced apart from duct D as shown in FIG. 2, thereby providing a space S between sleeve 12 and duct D. One reason for having a space S between sleeve 12 and duct D is to allow for insulation I to be inserted in this space as partially shown in FIG. 2. Another reason for leaving a space S is to allow for the use of a larger diameter neck 14 which provides more free space for air flow for venting, among other things, a dryer exhaust, thereby complying with IMC requirements. When a space between sleeve 12 and duct D is desired, it is preferred to use a bushing 24 as shown in FIGS. 2 and 10 and discussed hereafter.

Figure 3:
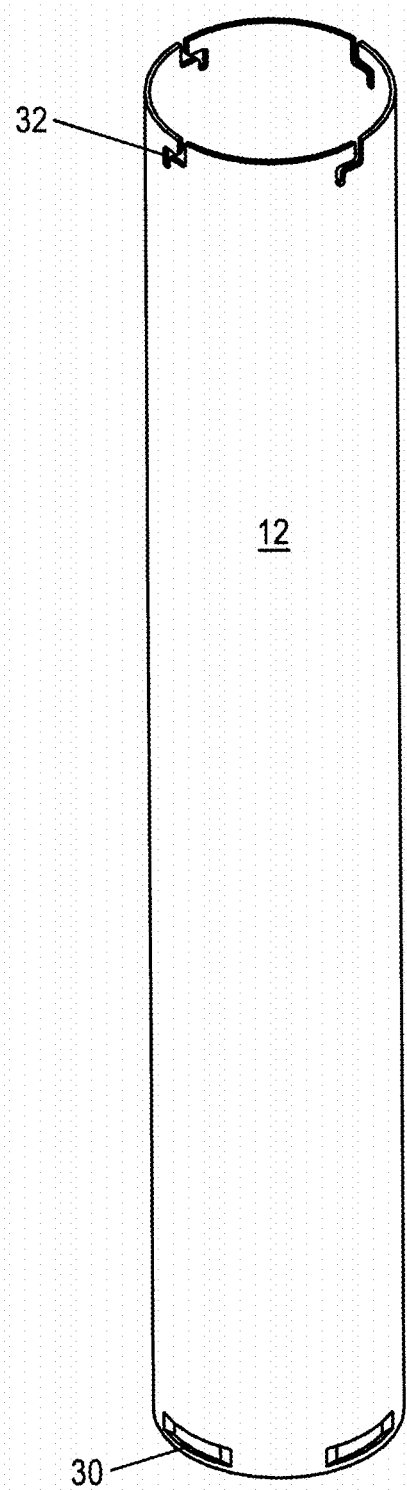
FIG. 3 shows the sleeve of the exhaust vent of FIG. 1.
Figure 3A:
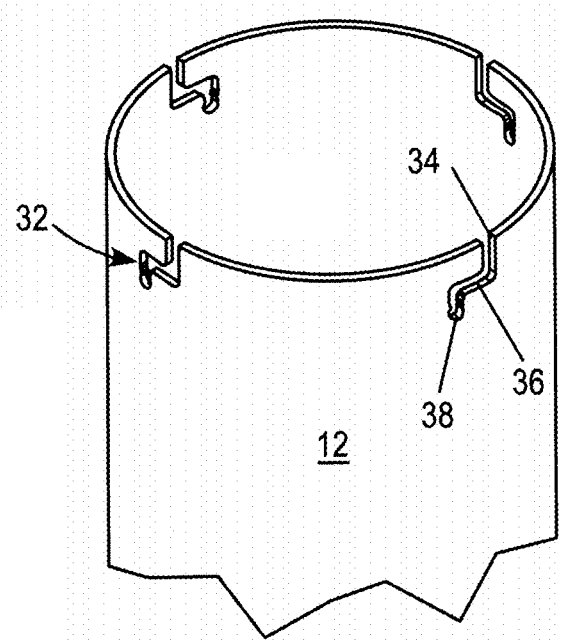
FIG. 3A is an enlarged view of the top of the sleeve of FIG. 3.
Figure 3B:
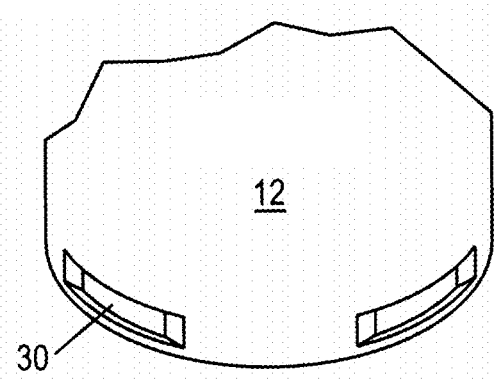
FIG. 3B is an enlarged view of the bottom of the sleeve of FIG. 3.

Sleeve 12 is preferably made of plastic such as polyvinylchloride (PVC) or high density polyethylene (HDPE). This provides for, among other things, lightweight construction, weatherproof construction, UV stabilized construction, simple installation and inexpensive manufacture. Referring to FIGS. 1, 2 and 3, sleeve 12 includes a plurality of apertures 30 as shown in FIGS. 3 and 3B and a plurality of twist lock channels 32 as shown in FIGS. 3 and 3A and discussed hereafter. In a preferred embodiment, these are four apertures 30 and four twist lock channels 32. The twist lock channels 32 comprise three segmented sections 34, 36 and 38. Apertures 30 are aligned with locking channels 32 to provide for consistently orienting the direction of the neck 14 when having a plurality of exhaust vents 10. Specifically, when apertures 30 in a plurality of exhaust vents 10 are all positioned the same, e.g. oriented square to an exterior wall, all locking channels 32 of the multiple exhaust vents 10 will be in the same position for receiving neck 14. This will allow for orienting all of the necks 14 in the same direction, if desired.

Sleeve 12 is secured to the galvanized duct D with a strapping band (not shown) or a plurality strapping bands. This provides for a nonintrusive connection of sleeve 12 to galvanized duct D. The strapping band is placed around the sleeve such that the strapping band will be laced through apertures 30 and engage the duct D, providing for a secure attachment of sleeve 12 to duct D.

Figure 4:
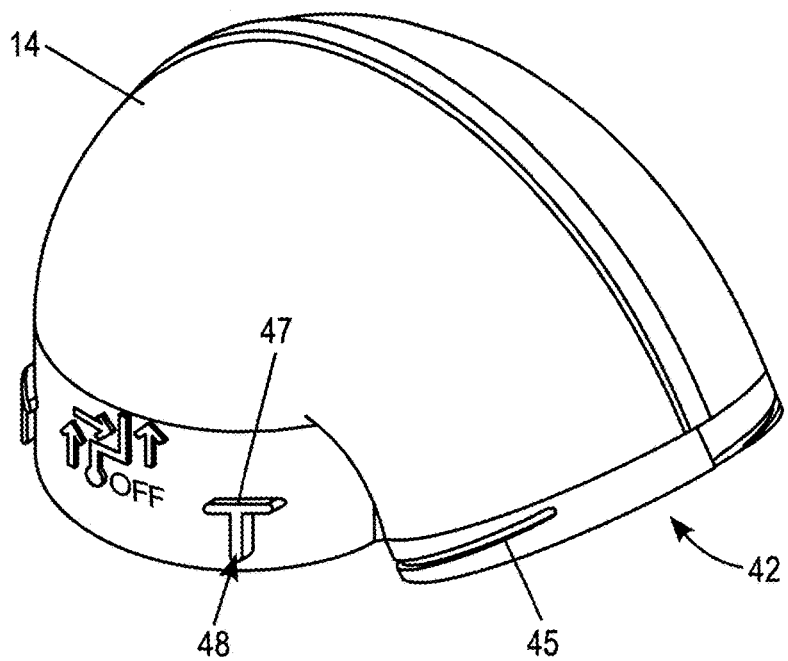
FIG. 4 shows a perspective view of the neck of the exhaust vent of FIG. 1.
Figure 4A:
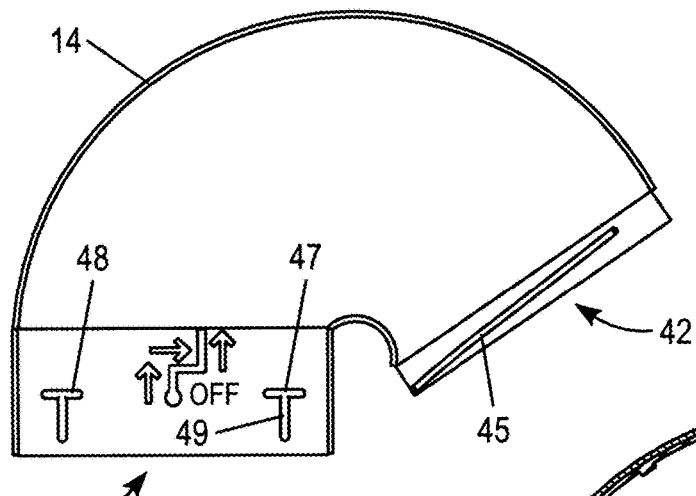
FIG. 4A shows a side view of the neck of FIG. 4.
Figure 4B:
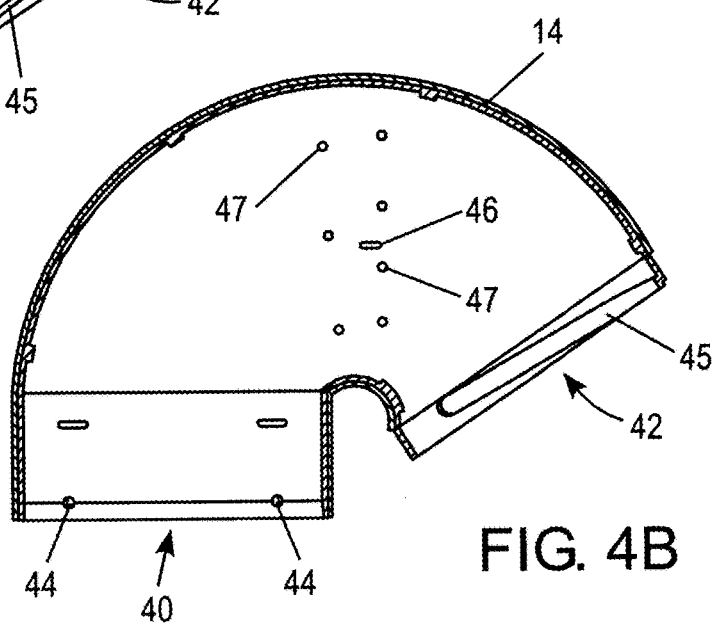
FIG. 4B shows a cross-section of the neck of FIG. 4A.

Referring to FIGS. 1, 2, 4, 4A and 4B, attached to sleeve 12 is a neck 14. Neck 14 is preferably a gooseneck shape as shown in the figures and having opening 40 for attaching to sleeve 12 and opening 42 for attachment of cap 16 or cap 16A. Neck 14 is preferably made of plastic such as PVC and HDPE and the interior surface is preferably seamless. Neck 14 is attached to sleeve 12 and includes means for attaching cap 16 or cap 16A. Neck 14 includes inside thereof damper 20 and damper ring 22. Referring to FIG. 4B, neck 14 includes four lugs 44 extending outwardly from the inside of neck 14 and adapted to engage twist lock channels 32. Lugs 44 will be inserted into the top portion 34 of twist lock channels 32 and neck 14 will be twisted or rotated such that lugs 44 end up at the bottom portion 38 of channels 32, that is a female to male connection. This will secure neck 14 to sleeve 12 without the use of tools. It will also allow for the easy removal of neck 14 from sleeve 12 for cleaning duct D or for providing access to duct D. Referring to FIGS. 4 and 4A, instructions for taking neck 14 off of sleeve 12 may be included on neck 14. In the alternative, the attachment of neck 14 to sleeve 12 may be made by friction fit, adhesive or other known connection means.

Figure 2A:
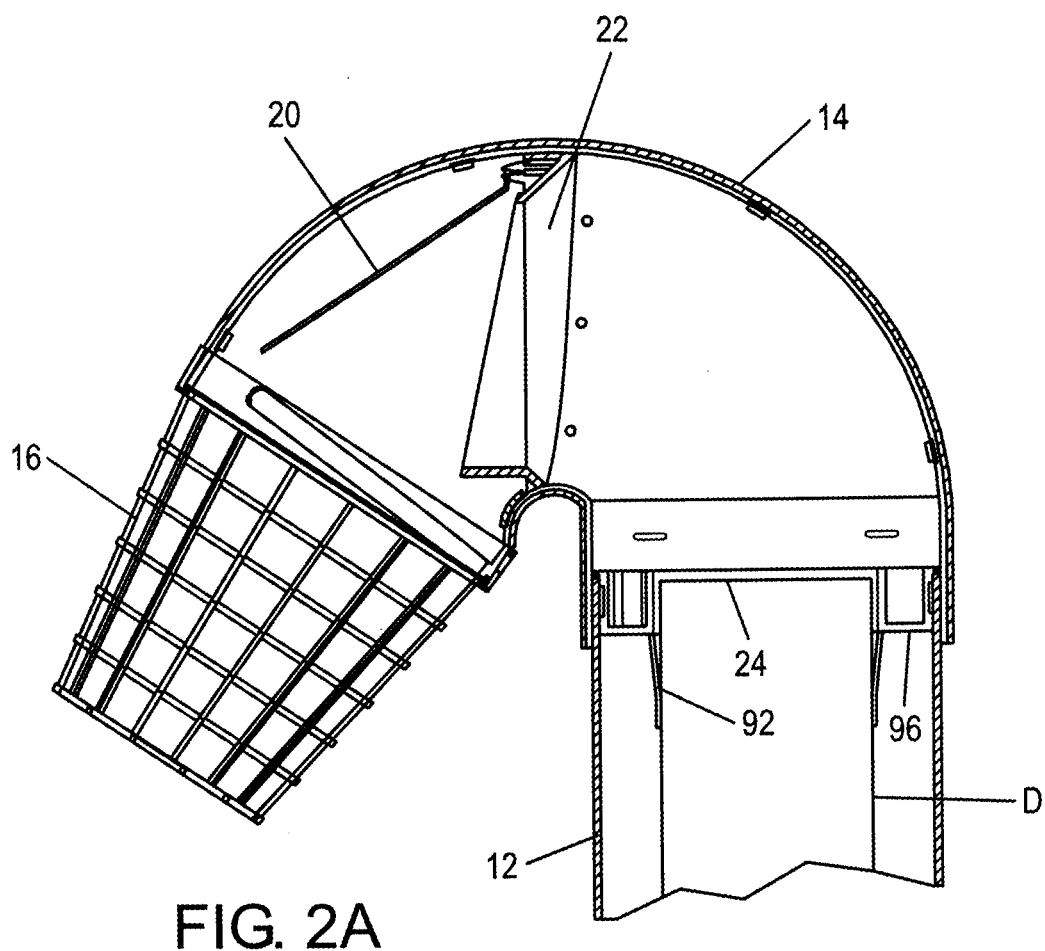
FIG. 2A is an enlarged view of the top of the exhaust vent shown in FIG. 2.

Neck 14 includes inside thereof damper ring 22, preferably eccentric in shape as shown in FIGS. 2, 2A, 6 and 6A. As seen in FIGS. 2 and 2A, damper ring 22 is attached at the bend in neck 14 and away from opening 42. This allows for better air flow and for damper 20 to open within neck 14. Damper ring 22 includes an exterior ring 50 and an interior ring 52. Exterior ring 50 is tapered from the top to the bottom. Damper ring 22 further includes tabs 54 having slots 56 for receiving and connecting damper 20 by means of damper rod 60 as discussed below. Damper ring 22 further includes slots 58 for engaging lugs 46 which extend inwardly from the inside of neck 14. Neck 14 further includes a plurality of posts 47 which may also hold damper ring 22 in place. Accordingly, damper ring 22 is secured inside neck 14 and damper 20 is secured to damper ring 22 by damper rod 60 in slots 56. Damper 20 includes a hinge 62 which allows damper 20 to seat on lip 53 of interior ring 52 when the damper 20 is closed. When venting dryer exhaust through duct D, damper 20 will move to an open position as shown in FIGS. 2 and 2A. When not venting, damper 20 seats on lip 53 of interior ring 52 to close off the exhaust vent system. While damper ring 22 is shown as a separate component of the exhaust vent assembly, it may be made integral with neck 14 without departing from the scope of the invention.

Additionally, other means for securing a damper in neck 14 may be utilized without departing from the scope of the invention. For example, neck 14 may include two slots and damper 20 may include rods for mating in the slots. The damper, therefore, fits inside neck and is attached in neck by the rods engaging the slots. The exhaust airflow will open the damper allowing the exhaust air to exit through the vent. Similarly, when the exhaust device is not on, the damper will close to prevent inflow of air.

Referring again to FIGS. 4, 4A and 4B, neck 14 includes threads 45 for attaching cap 16 or cap 16A. Neck 14 further includes four T-shaped members 48 extending outwardly therefrom which may be useful in attaching neck 14 to sleeve 12. For example, the top of T-shaped member 48 includes a portion 47 for pushing the neck 14 down onto sleeve 12 and a portion 49 for twisting neck 14 to secure lugs 44 to twist channels 32.

Neck 14 is adapted to be rotated on sleeve 12 360 degrees, in 90 degree increments based on the four lugs 44 and four twist lock channels 32. This will allow a contractor installing the exhaust vent 10 to move the neck 14 to a preferred position, including taking into consideration other exhaust vents on the roof or other equipment on the roof.

Figure 7:
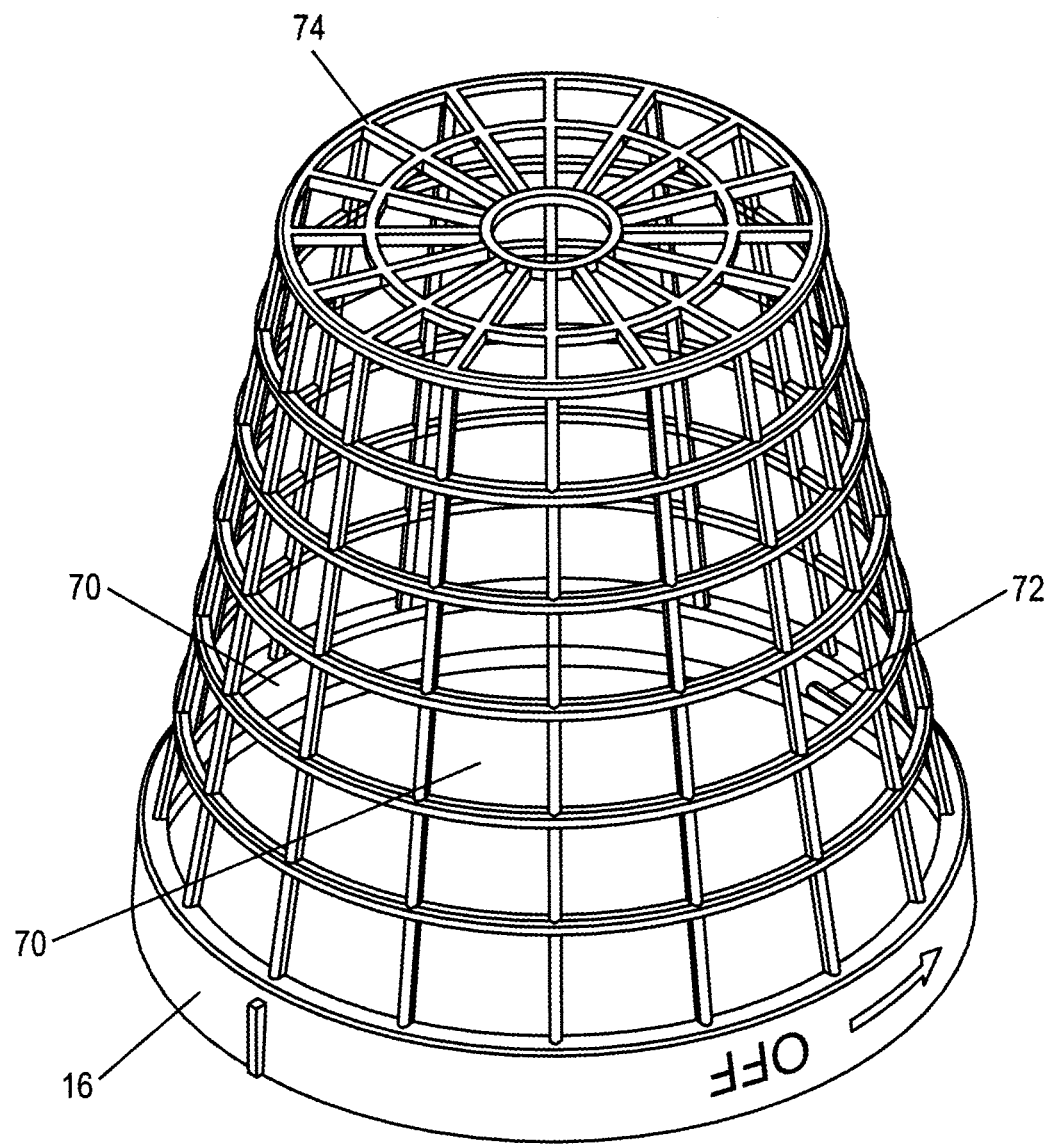
FIG. 7 shows the cap of the exhaust vent of FIG. 1.

Referring to FIGS. 1, 2 and 7, there is shown a cap 16. Cap 16 serves to allow venting of the exhaust through a plurality of openings 70 and to prevent entry by birds or the like. Cap 16 is attached to neck 14 by screw threads 45 on neck 14 and corresponding threads 72 on cap 16. In a presently preferred embodiment, cap 16 is generally cylindrically shaped with a flat end 74. However, it is understood that other shapes may be used without departing from the scope of the invention. Cap 16 is preferably made of plastic such as PVC or HDPE. Like the other components of exhaust vent 10, cap 16 may easily be connected and removed from neck 14 without tools, simply by screwing cap 16 on or off. Cap 16 is preferably used for venting a dryer exhaust. Cap 16 in conjunction with neck 14 provides for a large area for exhaust emission, thereby meeting IMC requirements.

Figure 8:
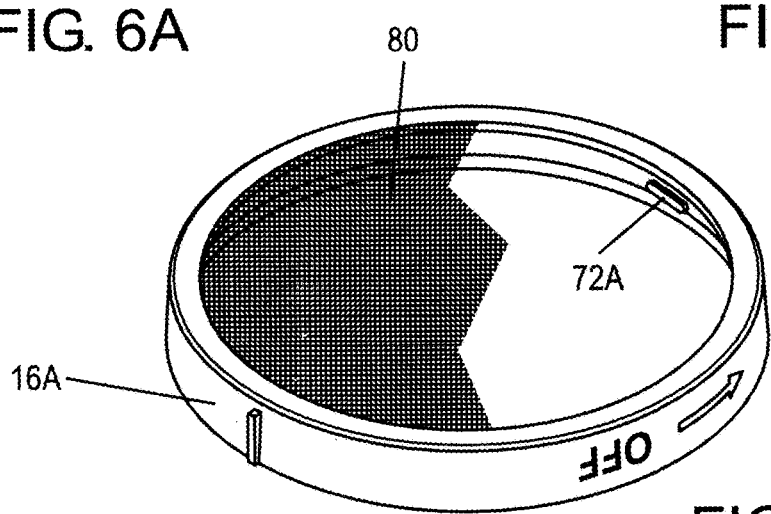
FIG. 8 shows a perspective view of an alternative cap having a screen for the exhaust vent of FIG. 1 and useful in preventing insects from entering the exhaust vent.

As an alternative to cap 16 and for other venting purposes, cap 16 may be replaced with cap 16A as shown in FIG. 8. Cap 16A includes internal threads 72A for attaching to neck 14. Cap 16A will include a screen 80 (partially shown) to prevent the entrance of insects or the like. The screen 80 may be of a material and size commensurate with the exhaust requirements. Cap 16A is preferably made of plastic such as PVC or HDPE.

Figure 9:
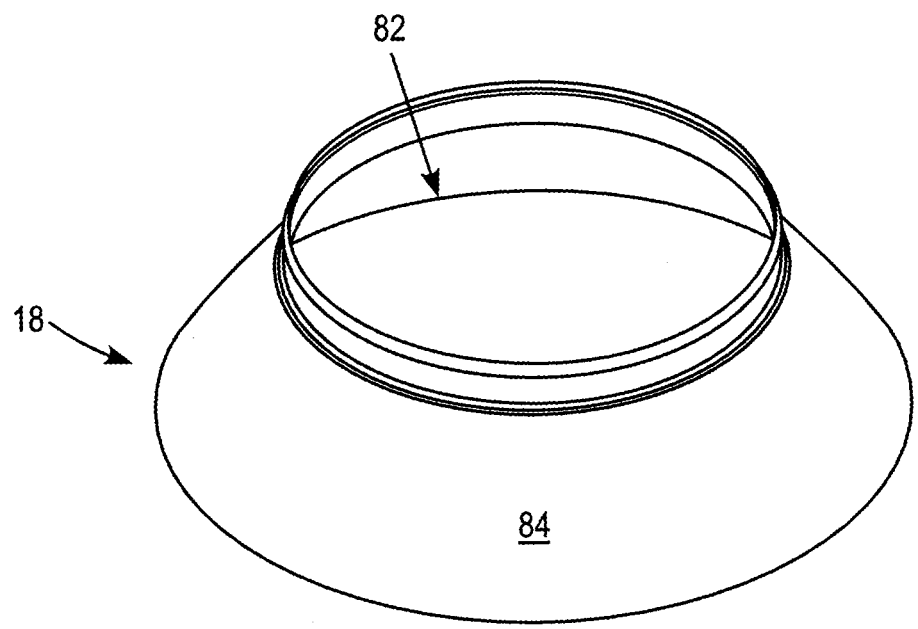
FIG. 9 shows the storm collar of the exhaust vent of FIG. 1.

Referring to FIG. 9, there is shown a storm collar 18 which fits over sleeve 12 and is held in place by a friction fit. Collar 18 is annular and includes an opening 82 for fitting over sleeve 12 and a sloped wall 84. Collar 18 is adapted to be adjacent to the roof R and provides for protection from rain and the elements. Storm collar 18 is preferably made of plastic such as PVC or HDPE.

Figure 2B:
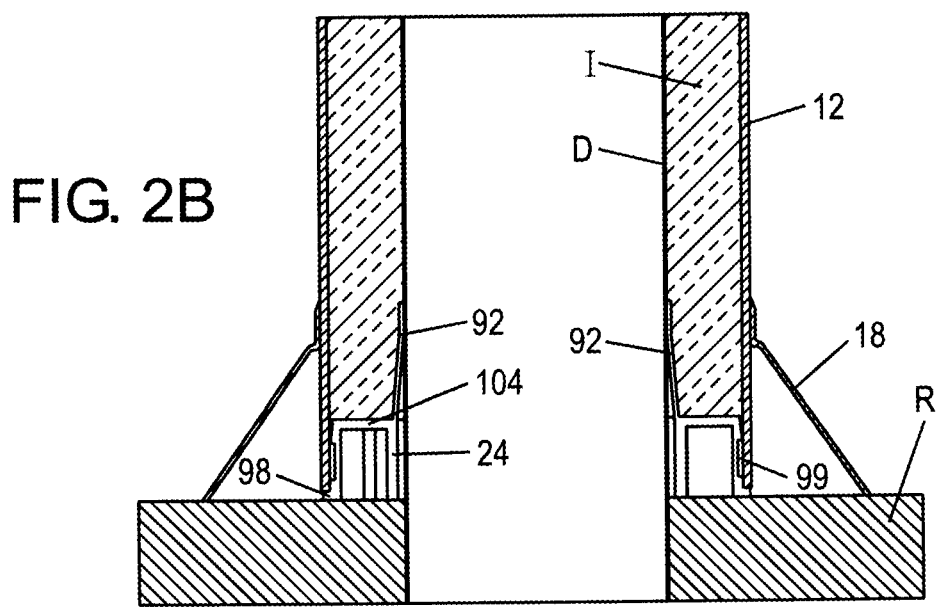
FIG. 2B is an enlarged view of the bottom of the exhaust vent shown in FIG. 2.

Referring to FIGS. 2, 2A, 2B and 10, there is shown a bushing 24. As noted above, this bushing 24 is useful when a space S is desired between duct D and sleeve 12. Bushing 24 includes an annular collar 90 and tabs 92. Collar 90 includes a top 94, bottom 96, lip 98, groove 99, slots 102 and apertures 104. Referring to FIG. 2B, the bushing 24 is placed over duct D, top 94 seats on roof R, and tabs 92 extend upwardly and adjacent to the exterior wall of duct D and collar 90 engages the inside wall of sleeve 12. Apertures 30 of sleeve 12 overlie groove 99 for allowing strapping to engage groove 99. The bottom of sleeve 12 seats on lip 98. Bushing 24 thereby creates space S between duct D and sleeve 12. Referring to FIG. 2A, the bushing 24 is secured adjacent the interior wall of sleeve 12 with tabs 92 extending downward on the outside wall of duct D. Collar 90 fits snuggly into sleeve 12 and lip 98 seats on top of sleeve 12. This also provides for space S between duct D and sleeve 12. Apertures 104 may be used to insert fasteners to secure bushing 24 into roof R, usually when retrofitting the exhaust vent to an existing structure. As noted above, insulation I may be inserted into space S to provide for an insulated exhaust vent, the insulation being partially shown in FIG. 2. An insulated exhaust vent is especially useful when venting a dryer. Additionally, as stated above, this space S provides a larger neck 14 providing for greater airflow, thereby meeting the requirements of IMC.

As noted above in the preferred embodiment of exhaust vent 10, all of the assembly components are plastic and the exhaust vent may be assembled without tools and without penetrative fasteners. The exhaust vent 10 may be made of a specific color with all of the components color coordinated. Besides the ease of installing exhaust vent 10 and the cost saving, the exhaust vent provides an aesthetically pleasing appearance.

As seen above, the present invention solves a number of problems of the prior art exhaust vents in a unique manner. For example, it weatherproofs and counter-flashes existing or new construction ducts for flat roofs. The exhaust vent 10 may be easily retrofitted on older projects; and it provides a back-draft damper and a bird proof assembly for dryer ducts on a flat roof. The plastic neck 14 is preferably one-piece having a uniform seamless radius throughout such that there is minimal restriction or friction on the air flow. The cap 16 or cap 16A screws onto neck 14 such that no tools are required. For a bathroom exhaust, one may use cap 16A as opposed to cap 16. The caps 16 and 16A are readily removable making cleaning easy. Additionally, cap 16 is believed to be self-cleaning due to its position being exposed to wind and rain, and there are no known self-cleaning dryer vent bird guards. The exhaust vent 10 is adjustable for different height exhaust ducts, e.g. the plastic sleeve 12 may be cut down for lower duct application. Due to the exhaust vent's light weight, it does not require additional duct support like field designed assemblies that exert leverage due to their weight cantilevering away from the vertical duct riser. Due to the plastic seamless construction, there are no screws in the air-stream, unlike conventional hoods that need to be fastened to the duct or metal venting.

Figure 12:
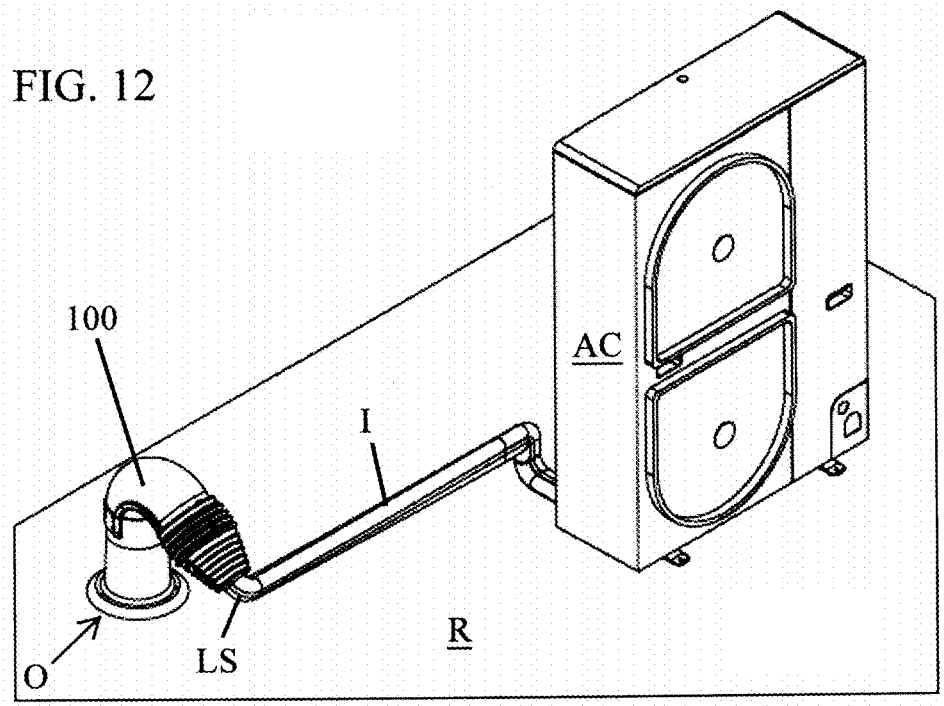
FIGS. 12 and 12A show perspective views of the utility termination connected to an air conditioning unit.
Figure 12A:
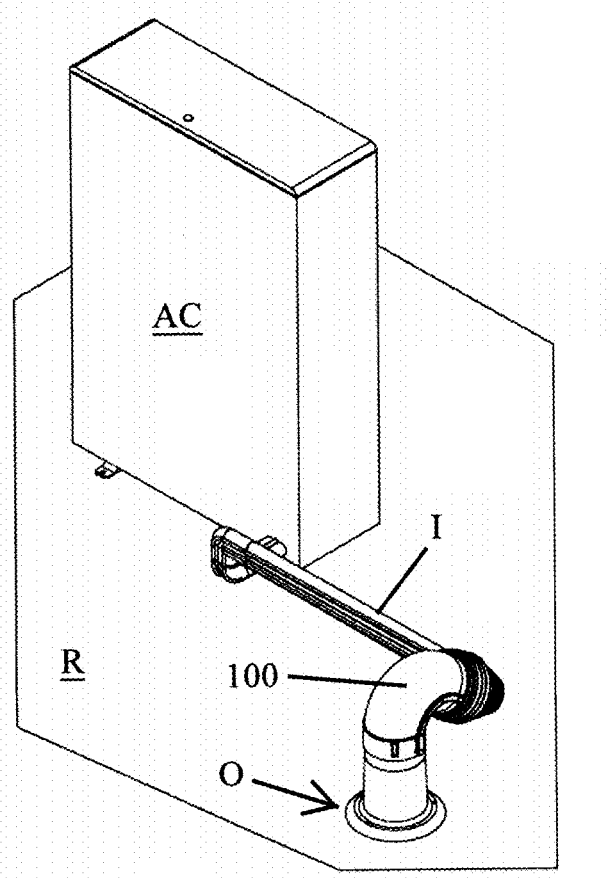

A preferred embodiment of the utility termination is shown at FIGS. 12-21. FIGS. 12 and 12A show a presently preferred embodiment of the utility termination 100 on a flat roof R. Line sets LS are pulled through an opening O in roof R and which opening is covered and flashed by the utility termination 100. The line sets are pulled through the utility termination and connected to an air conditioning unit AC. The line sets LS are preferably covered by insulation I. As discussed below, the line sets are easily pulled through the roof opening O and turned or bent to extend through the outlet of the utility termination and thereafter the utility termination is closed to cover the line sets to protect them from the environment. If work needs to be done to the line sets or if additional line sets are needed, the utility termination may be easily opened to undertake such work. The utility termination is made of a plastic material such as PVC or HDPE, preferably by injection molding.

Referring to FIGS. 13-21, the utility termination 100 comprises a one-piece plastic sleeve 110 which sleeve has a flashing, an annular body and a first part of a gooseneck. There is a second part of a gooseneck or cover 112 which completes the gooseneck when attached to the first part of the gooseneck of sleeve 110. Additionally, there is a cap 114 (FIG. 18) or 114A (FIG. 19) through which the line sets exit. These components will now be discussed in further detail.

Referring to FIGS. 13-16, the one-piece sleeve 110 comprises a flashing 120, an annular body 122 and a first part of a gooseneck 124. In a preferred embodiment, the sleeve 110 is approximately about 16 inches in height, which handles most line sets and allows for ease in injection molding. The sleeve 110 is installed over an opening in a flat roof through which line sets are pushed and/or pulled through and thereafter attached to an HVAC unit or the like. The flashing 120 of sleeve 110 will cover the opening in the roof and is attached to the roof by fasteners such as screws which screws are inserted through apertures 126 in top wall 128 of the flashing. The bottom wall of the flashing 120 may include an annular slot 130 for receiving a rubber gasket 132 to further seal the utility termination to the roof, i.e. a waterproof seal. The annular body 122 is preferably at least the diameter of the opening in the roof. The annular body has an upper wall 134 which forms an opening 136. When installed over a roof opening, the installer may look down into opening 136 to see the line sets and pull the line sets through the opening and bend them approximately 135 degrees in order that they exit over inside wall or trough 138 of the first part of the gooseneck 124. Gooseneck 124 further includes side walls 137 and end wall 139. Side walls 137 include apertures 137A for receiving fasteners, e.g. screws, when connecting cover 112 thereon.

Figure 13:
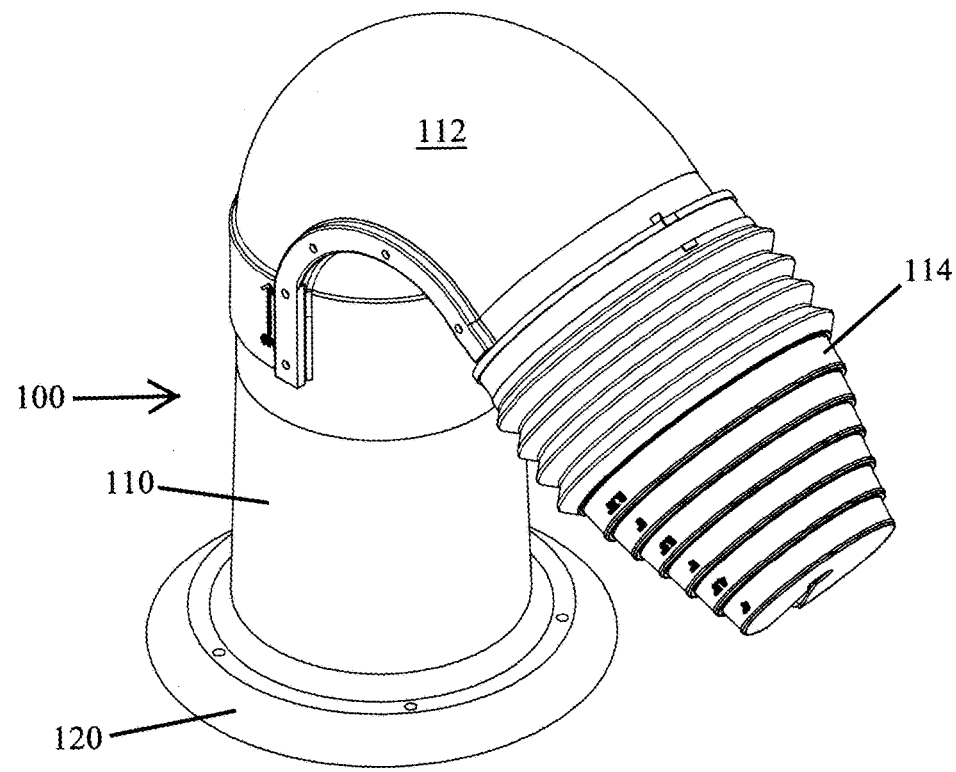
FIG. 13 is a plan view of the utility termination of the present invention.
Figure 14:
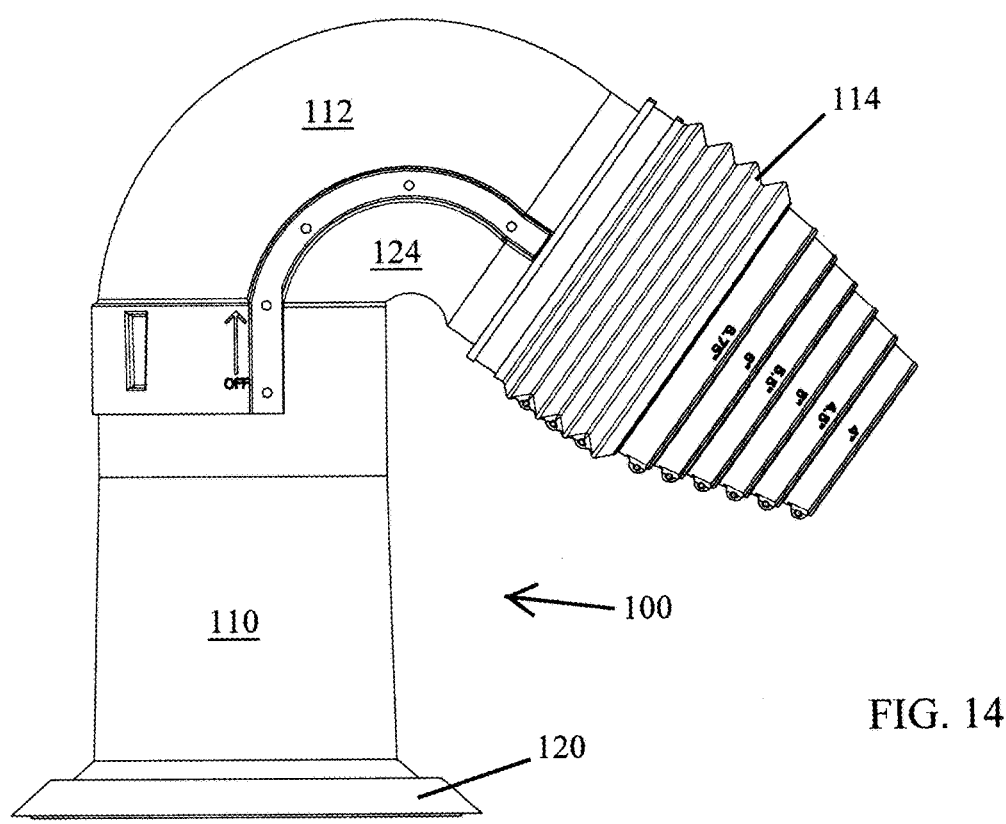
FIG. 14 is a side view of the utility termination of FIG. 13.

Referring to FIGS. 13, 14 and 17, there is a second part of a gooseneck or cover 112 which provides for a finished gooseneck when attached to the first part of a gooseneck 124. After the line sets are pulled through the opening 136 and bent over wall 138, the cover 112 is attached to the first part of gooseneck 124 to form the completed gooseneck and enclose the line sets in the utility termination and protect the opening O and inside of the utility termination from the outside elements. Cover 112 is attached to the first part of gooseneck 124 by suitable fastening means. The fastening means may be, for example, screws, friction fit and/or a snap-lock fit. Cover 112 has a partial sleeve 140 which extends over wall 132 of sleeve 110 and is attached thereto by friction fit; arcuate rails 142 with apertures 142A which fit over sidewalls 137 of gooseneck 124 and attached thereto by fasteners such as screws. The end walls 144 and 139 provide means for attaching cap 114 which in a preferred embodiment is friction fit and a hose clamp HC as shown in FIG. 20. End walls 144 and 139 include threads 148 which are used if the utility termination is converted to an exhaust vent.

Referring to FIGS. 18 and 19, there are disclosed two embodiments of the cap which is attached to the gooseneck 112, 124, namely, caps 114 and 114A. The caps 114 and 114A are made of a thermoplastic elastomer such as Santoprene®. The cap 114, 114A is attached to the gooseneck after cover 112 is attached to sleeve 110 and the line sets are outside the utility termination. The cap is constructed to be adjusted to surround and enclose the line sets as discussed below.

Referring to FIGS. 18A-18C, there is shown cap 114. The cap 114 has a bottom wall 150, side wall 152 and top wall 154. Top wall 154 has an opening 155 which, as described below, may be adjustable in size for different size line sets. A first portion of cap 114 has a bellows shape B and a second portion has a frustoconical shape FC. The bellows shape provides for flexible movement of the cap in conjunction with the exiting line sets. Bottom wall 150 has an annular opening 156 for receiving completed gooseneck 124, 112. There is a vertical opening 158 in side wall 152 which allows the cap 114 to be pulled apart to surround and enclose the line sets. Thereafter the opening 158 in the side wall is closed by suitable fastening means such as, but not limited to, snap-fit pin and slot members 160 and 162. Pin 160 has a ridge 164 which fits through opening 166 in slot member 162, and ridge 164 locks the members 160 and 162 in a closed position. The cap 114 may be opened by pulling pins 160 and ridges 164 back through openings 166. The frustoconical portion of side wall 152 includes thin walls 168 with a weakened portion 169 such as grooves or indentations or perforations. One or more of thin walls 168 of side wall 152 may be removed along weakened portion 169 to allow for the enlargement of opening 155 to accommodate different size line sets. By having the cap 114 split, the cap may be easily removed and reinstalled. This allows for ease of repair or the removal or addition of line sets.

Referring to FIG. 19, there is shown an alternative cap 114A. Cap 114A is two-pieces 170 and 172 and preferably made of a thermoplastic elastomer. The cap is connected by snap fit portions 174 and 176. The cap may also be connected by using a fastener such as a screw. Each portion of the cap 114 includes a thin wall 180 with a weakened portion 182 such as grooves or indentations or perforations. One or more portions of wall 180 may be removed to allow for the enlargement of aperture 184 to accommodate different size line sets. By having the cap 114A split, the cap may be removed and reinstalled. This allows for ease of repair or the removal or addition of line sets.

Figure 15:
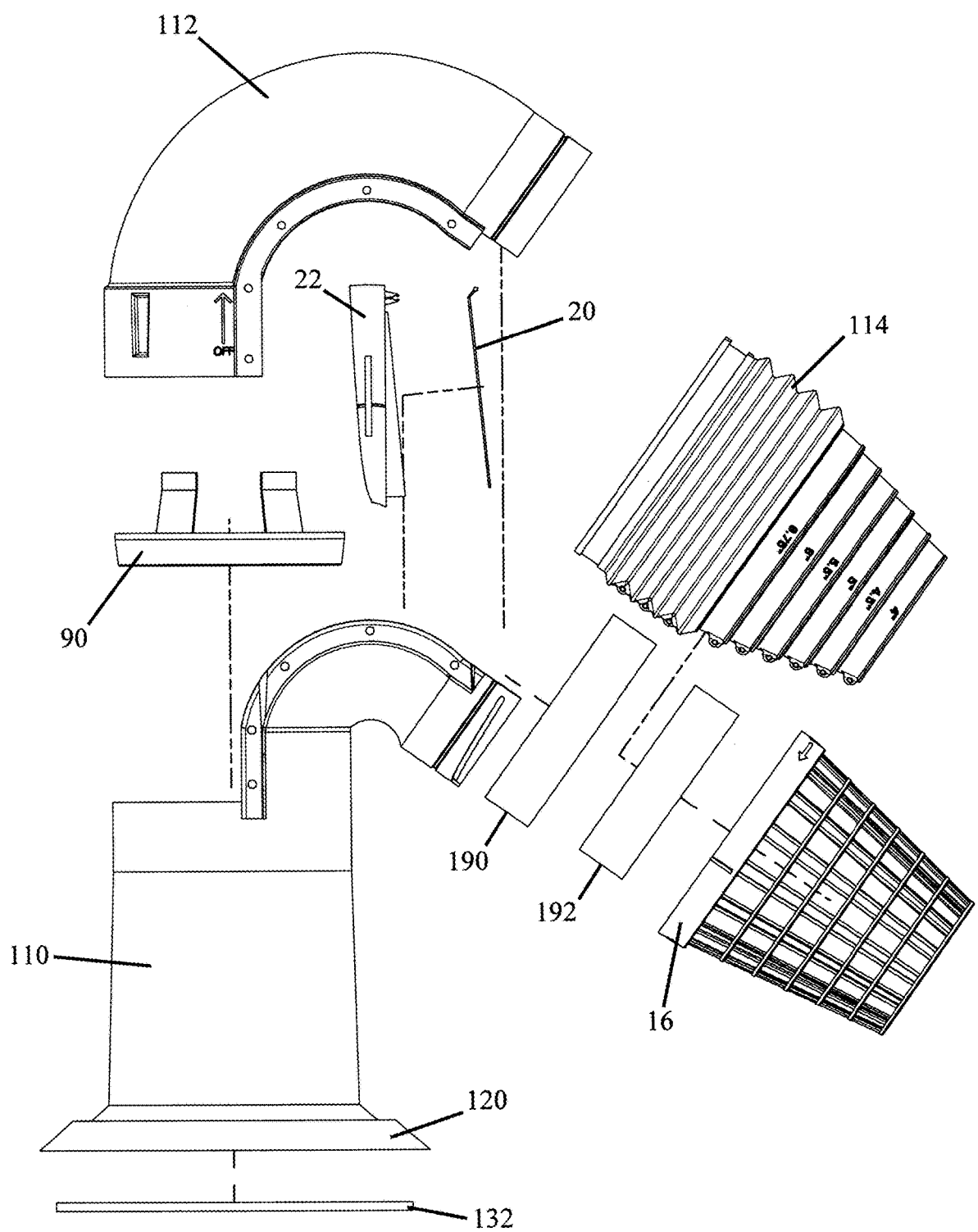
FIG. 15 is an exploded view of the components of the utility termination of FIG. 13 and including additional components which may be used to convert the utility termination of FIG. 13 to an exhaust vent similar to that shown in FIGS. 1-10.
Figure 16D:
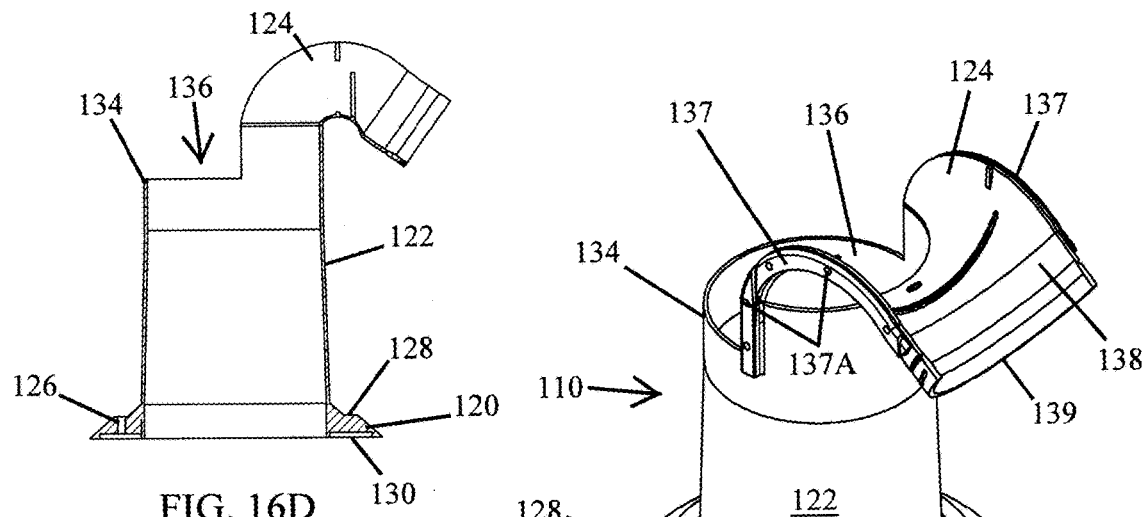
FIGS. 16-16D show views of the sleeve of the utility termination of FIG. 13.
Figure 16:
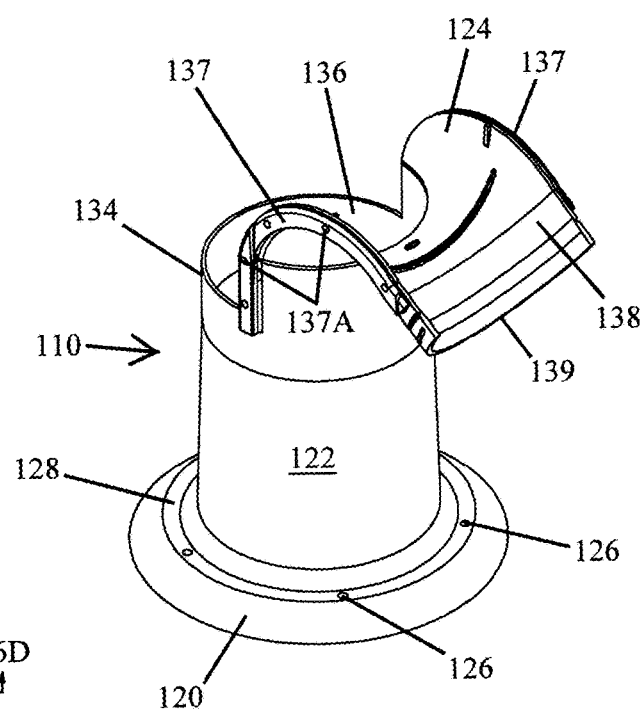
Figure 16C:
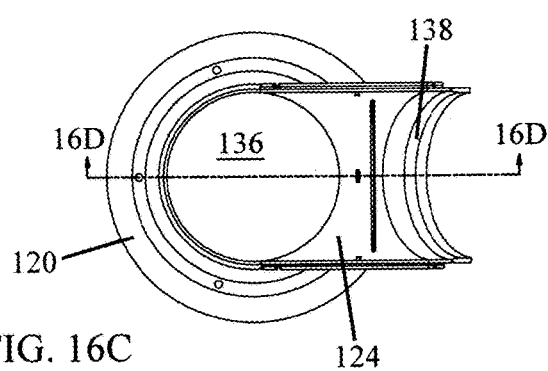
FIG. 16C is a top view.
Figure 16B:
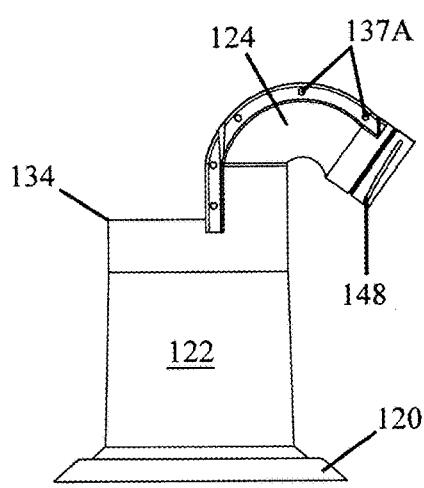
FIG. 16B is a side view.
Figure 16A:
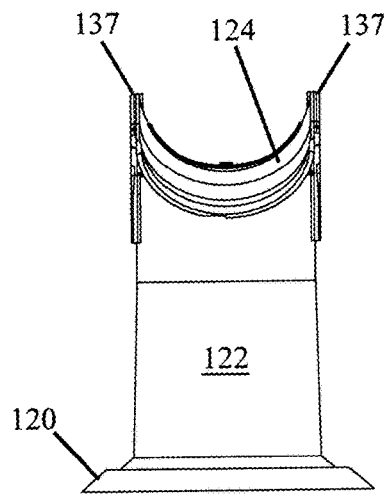
FIG. 16A is a front view.

Referring to FIGS. 12-21, use of the utility termination 100 will be explained in further detail. In a building having a flat roof with HVAC units on the roof, the line sets for connecting the HVAC unit are pushed and/or pulled though an opening in the roof. To protect the line sets from the environment and to be able to work on the line sets or add additional line sets, utility termination 100 provides a very functional and aesthetically pleasing termination. The utility termination is made of plastic and is light weight, durable and easy to assemble and disassemble. The utility termination is attached to the roof R over the opening in the roof by attaching sleeve 110 to the roof using screws through apertures 126. Flashing 120 seals the utility termination to the roof and a gasket 132 may be used to further seal the utility termination. At this point, cover 112 and cap 114 are not attached. The installer may grasp the line sets and pull them through opening 136 in sleeve 110 and bend them approximately 135 degrees over wall 138 of gooseneck 124. Thereafter, cover 112 is attached to sleeve 110 by partial sleeve 140 overlying wall 132 and arcuate rails 142 overlying side walls 137. The gooseneck is now complete and cover 112 is connected to gooseneck 124 by friction fit and screws. Thereafter, cap 114 is attached to gooseneck 124, 112 by friction fit and a hose clamp. The cap 114 is sized to fit the line sets by removing members 168 along weakened areas 169. In attaching the cap 114, it may be pulled apart to wrap around and surround the line sets, thereafter, it is attached to gooseneck 124, 112. Referring to FIGS. 15 and 20, inside cap 114 may be a compression members 190 and 192 which compress on the line sets to further seal them in the utility termination. Cap 114 is then closed by the closure members 160, 162. If the line sets require to be worked on or add additional line sets, the utility termination 100 is easily disassembled by first removing cap 114 and then removing cover 112.

Figure 5:
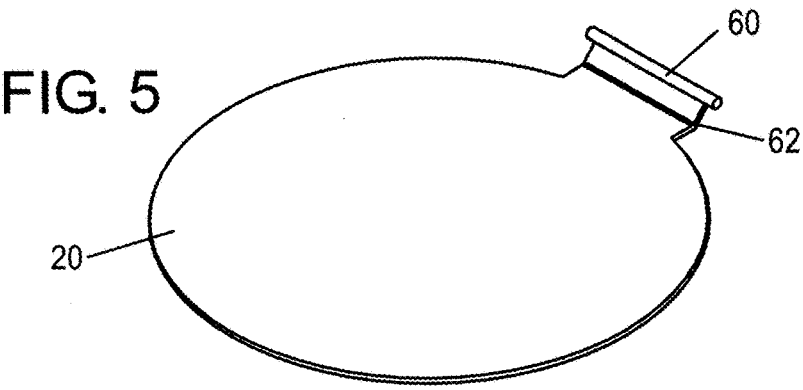
FIG. 5 shows the damper which is inside the neck of the exhaust vent of FIG. 1.
Figures 6, 6A:
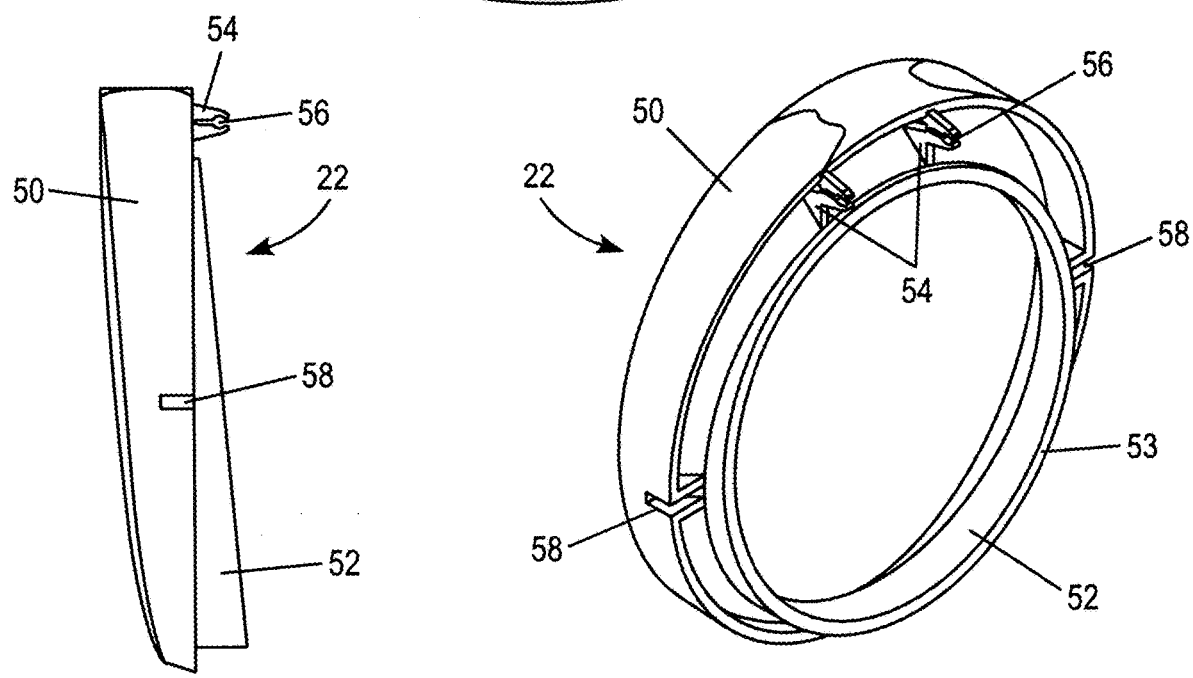
FIG. 6 shows a perspective view of the damper ring located in the neck of the exhaust vent of FIG. 1 and to which the damper of FIG. 5 is attached.
FIG. 6A shows a side view of the damper ring of FIG. 6.

The primary functional differences between the utility termination 100 of the invention and the exhaust vent 10 is in the gooseneck and the cap of the utility termination. The gooseneck in the exhaust vent will include a damper ring 22, as shown in FIGS. 6 and 15, in the gooseneck 114 with a damper 20 member, as shown in FIGS. 5 and 15. Additionally, a different cap 16 as shown in FIG. 7 is used for the exhaust vent. Referring to FIG. 15, for manufacturing purposes, a manufacturer may manufacture the parts for the utility termination and subsequently sell the utility termination; or the manufacturer may add a damper ring 22 and a damper 20 to the gooseneck of the utility termination and substitute a cap 16 for cap 114 of the utility termination, to be sold as an exhaust vent.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. A utility termination assembly for line sets for use on a flat roof comprising
   a plastic sleeve adapted to overlie an opening in said flat roof for receiving said line sets through said opening in said flat roof, said plastic sleeve having a flashing, an annular body and a first part of a gooseneck;
   a plastic second part of a gooseneck adapted to attach to said plastic sleeve and form a gooseneck; and
   a cap adapted to be attached to an outer end of said gooseneck wherein said cap is flexible and adapted to being pulled apart along a side wall of said cap to surround and enclose said line sets and thereafter be closed, wherein said line sets are adapted to exit an outer end of said cap.

2. The utility termination assembly of claim 1 wherein a first portion of said side wall of said cap is bellows shape.

3. The utility termination assembly of claim 2 wherein a second portion of said side wall of said cap is frustoconical shape.

4. The utility termination assembly of claim 1 wherein said cap is adapted to be sized for different sized line sets.

5. The utility termination assembly of claim 3 wherein said second portion of said side wall of said cap is adapted to be sized for different sized line sets.

6. The utility termination assembly of claim 1 wherein said plastic second part of a gooseneck is connected to said sleeve by friction fit and fasteners.

7. The utility termination assembly of claim 1 wherein said flashing includes an annular bottom wall having an annular slot and an annular gasket is located in said annular slot.

8. The utility termination assembly of claim 1 wherein said plastic sleeve is a one-piece plastic sleeve.

9. The utility termination assembly of claim 1 wherein said assembly is adapted to be converted to an exhaust vent by including a damper in said gooseneck and removing said cap and replacing said cap with a cap having a plurality of openings.

10. The utility termination assembly of claim 1 wherein said annular body of said sleeve includes an opening for an installer of said utility termination assembly to view said line sets and pull said line sets through said opening when said second part of said gooseneck is not attached to said sleeve.

11. A method of installing HVAC line sets to an HVAC unit on a flat roof of a building comprising the steps of
   a. locating said line sets in an opening of said flat roof;
   b. installing a utility termination assembly over said opening of said flat roof and said line sets;
   c. said utility termination assembly comprising a plastic sleeve adapted to overlie said opening in said flat roof for receiving said line sets through said opening of said flat roof, said plastic sleeve having a flashing, an annular body and a first part of a gooseneck; a plastic second part of a gooseneck adapted to attach to said plastic sleeve and form a gooseneck; and a cap adapted to be attached to an outer end of said gooseneck wherein said cap is flexible and adapted to being pulled apart along a side wall of said cap to surround and enclose said line sets wherein said line sets are adapted to exit an outer end of said cap;
   d. wherein said plastic sleeve is attached to said roof and said annular body has an opening rendering said line sets visible through said opening;
   e. pulling said line sets through said opening of said roof and said opening of said plastic sleeve and bending the line sets over a trough of said first part of said gooseneck;
   f. attaching said second part of said gooseneck to said sleeve to form a gooseneck;
   g. attaching said cap to said outer end of said gooseneck wherein said cap includes means for adjusting the size of an opening in said cap to the size of said line sets; and
   h. pulling said line sets out the end of said cap and attaching said line sets to said HVAC unit.

12. The method of claim 11 wherein a first portion of said side wall of said cap is bellows shape.

13. The method of claim 12 wherein a second portion of said side wall of said cap is frustoconical shape.

14. The method of claim 11 wherein said flashing includes an annular bottom wall having an annular slot and an annular gasket is located in said annular slot.

15. The method of claim 11 wherein said plastic sleeve is a one-piece plastic sleeve.

16. A utility termination assembly for line sets for use on a flat roof comprising
   a one-piece plastic sleeve adapted to overlie an opening in said flat roof for receiving said line sets through said opening in said flat roof, said plastic sleeve having a flashing, an annular body and a first part of a gooseneck;
   a plastic second part of a gooseneck adapted to attach to said plastic sleeve and form a gooseneck; and
   a cap adapted to be attached to an outer end of said gooseneck wherein said cap is flexible and adapted to being pulled apart along a side wall of said cap to surround and enclose said line sets and thereafter be closed;
   wherein said line sets are adapted to exit an outer end of said cap;
   wherein a first portion of said side wall of said cap is bellows shape and a second portion of said side wall of said cap is frustoconical shape; and
   wherein said cap is adapted to be sized for different sized line sets.

17. The utility termination assembly of claim 16 wherein said annular body of said sleeve includes an opening for an installer of said utility termination to view said line sets and pull said line sets through said opening when said second part of said gooseneck is not attached to said sleeve.

18. The utility termination assembly of claim 16 wherein said flashing includes an annular bottom wall having an annular slot and an annular gasket is located in said annular slot.

* * * * *